United States Patent
Tabata et al.

(10) Patent No.: US 8,267,824 B2
(45) Date of Patent: Sep. 18, 2012

(54) CONTROL DEVICE FOR VEHICLE POWER TRANSMITTING APPARATUS

(75) Inventors: Atsushi Tabata, Okazaki (JP); Hiroyuki Shibata, Toyota (JP); Kenta Kumazaki, Toyota (JP); Tooru Matsubara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1021 days.

(21) Appl. No.: 12/219,804

(22) Filed: Jul. 29, 2008

(65) Prior Publication Data
US 2009/0042690 A1 Feb. 12, 2009

(30) Foreign Application Priority Data
Aug. 6, 2007 (JP) ................................. 2007-204334

(51) Int. Cl.
*B60W 10/04* (2006.01)
(52) U.S. Cl. .................................. 475/3; 477/5
(58) Field of Classification Search .................. 477/3, 5; 180/65.265, 65.27, 65.275; 475/5, 150, 153; 701/51, 53, 55, 56
See application file for complete search history.

(56) References Cited

U.S. PATENT DOCUMENTS

| | | | | |
|---|---|---|---|---|
| 6,499,370 | B2 * | 12/2002 | Bowen | 74/330 |
| 2009/0140521 | A1 * | 6/2009 | Bryan et al. | 290/31 |
| 2010/0228412 | A1 * | 9/2010 | Sah | 701/22 |

FOREIGN PATENT DOCUMENTS

| | | |
|---|---|---|
| JP | A-2004-153946 | 5/2004 |
| JP | A-2005-264762 | 9/2005 |
| JP | A-2006-063822 | 3/2006 |
| JP | A-2007-050866 | 3/2007 |

OTHER PUBLICATIONS

Oct. 25, 2011 Office Action issued in Japanese Patent Application No. 2007-204334 (with partial English Translation).

* cited by examiner

*Primary Examiner* — John Walters
*Assistant Examiner* — James Triggs
(74) *Attorney, Agent, or Firm* — Oliff & Berridge, PLC

(57) ABSTRACT

The present invention relates to a control device for a vehicle power transmitting apparatus. The vehicle power transmitting apparatus includes an electrically controlled differential portion of which differential state is controlled between a rotation speed of an input shaft to which power of an engine is input and a rotation speed of an output shaft by controlling an operational state of an electric motor connected to a rotary element of a differential mechanism, and a shifting portion constructing a part of a power transmitting path. The control device includes a correspondence controlling unit for controlling the engine or the vehicle power transmitting apparatus to allow the shifting portion to be shifted when a command for shifting by a manual shift operation is issued in an operating region restricting the shifting of the shifting portion.

19 Claims, 11 Drawing Sheets

|  | C1 | C2 | B1 | B2 | B3 | SHIFTING RATIO | STEP |
|---|---|---|---|---|---|---|---|
| 1st | O |  |  |  | O | 3.357 | 1.54 |
| 2nd | O |  |  | O |  | 2.180 | 1.53 |
| 3rd | O |  | O |  |  | 1.424 | 1.42 |
| 4th | O | O |  |  |  | 1.000 | TOTAL 3.36 |
| R |  | O |  |  | O | 3.209 |  |
| N |  |  |  |  |  |  |  |

O ENGAGED

CONTROL DEVICE FOR VEHICLE POWER TRANSMITTING APPARATUS

TECHNICAL FIELD

This invention relates to a control device for a vehicle power transmitting apparatus, and, more particularly, to a technique for improving the performance of a manual shift operation when shifting is performed by the manual shift operation.

BACKGROUND ART

A vehicle power transmitting apparatus of a hybrid type is known which includes an electrically controlled differential portion and a shifting portion serving as a part of a power transmitting path. In the electrically controlled differential portion, a differential state of the rotation speeds between an input shaft and the rotation speed of an output shaft is controlled by controlling the operational state of an electric motor connected to a rotary element of a differential mechanism so that the motor power can be transmitted thereto. For example, a control device for a vehicle driving unit disclosed in Patent Literature 1 (Japan Patent Publication No. 2005-264762) can be mentioned as such a controller. According to a technique disclosed in this patent literature, when an engine is started, a first electric motor and a second electric motor are rotated in the same direction, and resultantly the rotation speed of the engine is rapidly increased to a rotation speed at which an engine fuel can be ignited.

In a hybrid-type vehicle power transmitting apparatus, such as that disclosed in Patent Literature 1 or other patent literatures, for example, when the vehicle transmission i.e. the shifting portion is manually shifted down toward a low-speed shifting range (or toward a low-speed gear position) during high-speed running, the rotation speed of a predetermined rotary element of the electrically controlled differential portion and that of the shifting portion are increased so that the rotary elements are rotated at a high speed. To protect these predetermined rotary elements, it is generally known to reject shifting performed by a manual shift operation and to controllably keep the rotation speed of the predetermined rotary elements within the range of an allowable rotation speed.

Especially in a hybrid-type vehicle power transmitting apparatus that includes an electrically controlled differential portion as mentioned above, there is a case in which a predetermined rotary element serving as a component of the electrically controlled differential portion is rotated at a high speed by a differential operation during shifting. Therefore, if an electric motor is connected to the predetermined rotary element, shifting by the manual shift operation might be rejected by restrictions on the rotation speed of the electric motor. Additionally, if the relative rotation speed of each rotary element serving as a component of the electrically controlled differential portion increases during shifting, the rotation speed of a predetermined rotary element participating in the differential operation will be liable to be increased, and shifting by the manual shift operation might be rejected by restrictions on the rotation speed of the predetermined rotary element. Therefore, chances to reject shifting performed by the manual shift operation are increased by these restrictions, and there is a fear that usability or drivability during the manual shift operation will deteriorate.

SUMMARY OF THE INVENTION

The present invention is made in consideration of these circumstances. It is therefore an object of the present invention to provide, in a vehicle power transmitting apparatus including an electrically controlled differential portion and a shifting portion, a control device for the vehicle power transmitting apparatus that has improved operability during a manual shift operation.

For achieving the above object, a first aspect of the invention relates to a control device for a vehicle power transmitting apparatus. The vehicle power transmitting apparatus comprises (i) an electrically controlled differential portion of which differential state is controlled between a rotation speed of an input shaft to which power of an engine is input and a rotation speed of an output shaft by controlling an operational state of an electric motor connected to a rotary element of a differential mechanism, and (ii) a shifting portion constructing a part of a power transmitting path.

The control device includes correspondence controlling means (portion) for controlling the engine or the vehicle power transmitting apparatus to allow the shifting portion to be shifted when a command for shifting by a manual shift operation is issued in an operating region restricting the shifting of the shifting portion.

In a second aspect of the invention, the correspondence controlling means (portion) controls the engine or the vehicle power transmitting apparatus so that a rotation speed of the electric motor falls within an allowable rotation speed range during shifting.

In a third aspect of the invention, the correspondence controlling means (portion) controls the engine or the vehicle power transmitting apparatus so that a relative rotation speed between rotary elements of the electrically controlled differential portion falls within an allowable rotation speed range during shifting.

In a fourth aspect of the invention, the correspondence controlling means (portion) changes the rotation speed of the engine to allow shifting of the shifting portion in the operating region restricting the shifting.

In a fifth aspect of the invention, the correspondence controlling means controls the rotation speed of the engine to controls a rotation speed of one rotary element constructing the electrically controlled differential portion.

In a sixth aspect of the invention, the correspondence controlling means (portion) changes the rotation speed of the electric motor to allow shifting of the shifting portion in the operating region restricting the shifting.

In a seventh aspect of the invention, the correspondence controlling means (portion) controls the rotation speed of the electric motor to control a rotation speed of one rotary element constructing the electrically controlled differential portion.

In an eighth aspect of the invention, the command for shifting by a manual shift operation is a command for downshifting, and the correspondence controlling means (portion) controls the engine or the vehicle power transmitting apparatus so that the rotation speed of the electric motor exceeds a predetermined rotation speed during shifting.

In a ninth aspect of the invention, the command for shifting by a manual shift operation is a command for downshifting, and the correspondence controlling means (portion) controls the engine or the vehicle power transmitting apparatus so that a relative rotation speed between rotary elements of the electrically controlled differential portion falls below a predetermined rotation speed during shifting.

In a tenth aspect of the invention, the shifting portion is a step-variable transmission.

In an eleventh aspect of the invention, the shifting portion can be automatically shifted.

In a twelfth aspect of the invention, the electrically controlled differential portion is controlled in an operational state of the electric motor to operate as a continuously variable shifting mechanism.

In a thirteenth aspect of the invention, the electrically controlled differential portion is constructed by two or more electric motors and a planetary gear set.

In a fourteenth aspect of the invention, the shifting portion is an automatic transmission.

Effects of the present invention will be hereinafter described. According to the first aspect of the present invention, the control device includes correspondence controlling means for controlling the engine or the vehicle power transmitting apparatus to allow the shifting portion to be shifted when a command for shifting by a manual shift operation is issued in an operating region restricting the shifting of the shifting portion. Therefore, the operable region allowing shifting by the manual shift operation can be enlarged, and the operability of the manual shift operation can be improved.

According to the second aspect of the present invention, the correspondence controlling means controls the engine or the vehicle power transmitting apparatus so that a rotation speed of the electric motor falls within an allowable rotation speed range during shifting. Therefore, upon the manual shift operation, the shifting portion is shifted even in the operating region restricting shifting in ordinary cases because the rotation speed of the electric motor exceeds the allowable rotation speed during shifting.

According to the third aspect of the present invention, the correspondence controlling means controls the engine or the vehicle power transmitting apparatus so that a relative rotation speed between rotary elements of the electrically controlled differential portion falls within an allowable rotation speed range during shifting. Therefore, upon the manual shift operation, the shifting portion is shifted even in an operating region restricting shifting in ordinary cases because the relative rotation speed exceeds the allowable rotation speed during shifting.

According to the fourth aspect of the present invention, the correspondence controlling means changes the rotation speed of the engine to allow shifting of the shifting portion in the operating region restricting the shifting. Therefore, the operable range allowing shifting by the manual shift operation can be enlarged, and the operability of the manual shift operation can be improved.

According to the fifth aspect of the present invention, the correspondence controlling means controls the rotation speed of the engine to control the rotation speed of one rotary element constructing the electrically controlled differential. Therefore, the predetermined rotary element constructing the electrically controlled differential portion can be prevented from being rotated at a high speed during shifting. As a result, the shifting portion can be shifted in the operating region restricting the shifting.

According to the sixth aspect of the present invention, the correspondence controlling means changes the rotation speed of the electric motor to allow shifting of the shifting portion in the operating region restricting the shifting. Therefore, the operable region allowing shifting by the manual shift operation can be enlarged, and the operability of the manual shift operation can be improved.

According to the seventh aspect of the present invention, the correspondence controlling means controls the rotation speed of the electric motor to control the rotation speed of one rotary element constructing the electrically controlled differential. Therefore, one predetermined rotary element constructing the electrically controlled differential portion can be prevented from being rotated at a high speed during shifting. As a result, the shifting portion can be shifted in the operating region restricting the shifting.

According to the eighth aspect of the present invention, the command for shifting by a manual shift operation is a command for downshifting, and the correspondence controlling means controls the engine or the vehicle power transmitting apparatus so that the rotation speed of the electric motor exceeds a predetermined rotation speed during shifting. Therefore, the rotation speed of the electric motor is prevented from rotated in the negative rotational direction (reverse direction) at a high speed during shifting.

According to the ninth aspect of the present invention, the command for shifting by a manual shift operation is a command for downshifting, and the correspondence controlling means controls the engine or the vehicle power transmitting apparatus so that a relative rotation speed between rotary elements of the electrically controlled differential portion falls below a predetermined rotation speed during. Therefore, the relative rotation speed between rotary elements of the electrically controlled differential portion is prevented from being rotated at a high speed during shifting.

According to the tenth aspect of the present invention, the shifting portion is a step-variable transmission. Therefore, the correspondence controlling means operates to shift the shifting portion even in a case in which the shifting is restricted based on the speed ratio of a gear position. Thus, the shifting portion is shifted to a gear position desired by a driver.

According to the eleventh aspect of the present invention, the shifting portion can be automatically shifted. Therefore, the shifting portion is automatically shifted according to a running state of the vehicle in addition to the performance of a manual shift operation, so that a suitable driving torque can be obtained.

According to the twelfth aspect of the present invention, the electrically controlled differential portion is controlled in an operational state of the electric motor to operate as a continuously variable shifting mechanism. Therefore, the continuously variable transmission is constructed by the electrically controlled differential portion and the shifting portion, changing a driving torque smoothly. The electrically controlled differential portion can serve also as a step variable transmission by changing the speed ratio stepwise, not only as an electric continuously variable transmission by continuously changing the speed ratio.

According to the thirteenth aspect of the present invention, the electrically controlled differential portion is constructed by two or more electric motors and a planetary gear set. Therefore, controlling the two or more electric motors controls the rotation speed of each rotary element of the planetary gear set, so that the electrically controlled differential portion can serve as the continuously variable transmission.

According to the fourteenth aspect of the present invention, the shifting portion is an automatic transmission. Therefore, the shifting portion is automatically shifted according to a running state of the vehicle to render a suitable driving torque.

Preferably, the planetary gear set is a single pinion type planetary gear set. With this structure, axial dimension of the differential mechanism becomes small. Additionally, the differential mechanism is easily constructed by a single pinion type planetary gear set.

Preferably, a total speed ratio of the vehicle power transmitting apparatus is established based on the speed ratio (gear ratio) of the shifting portion and the speed ratio of the electrically controlled differential portion. With this structure, the driving force can be widely obtained using the speed ratio of the shifting portion.

BRIEF DESCRIPTION OF THE DRAWINGS

FIG. 1 is a skeleton diagram showing structure of a vehicle power transmitting apparatus of one embodiment according to the present invention for use in a hybrid vehicle.

FIG. 2 is a functional diagram illustrating combined operations of hydraulically operated frictional coupling devices for use in the vehicle power transmitting apparatus shown in FIG. 1.

PREFERRED EMBODIMENTS OF THE INVENTION

Figure 3:
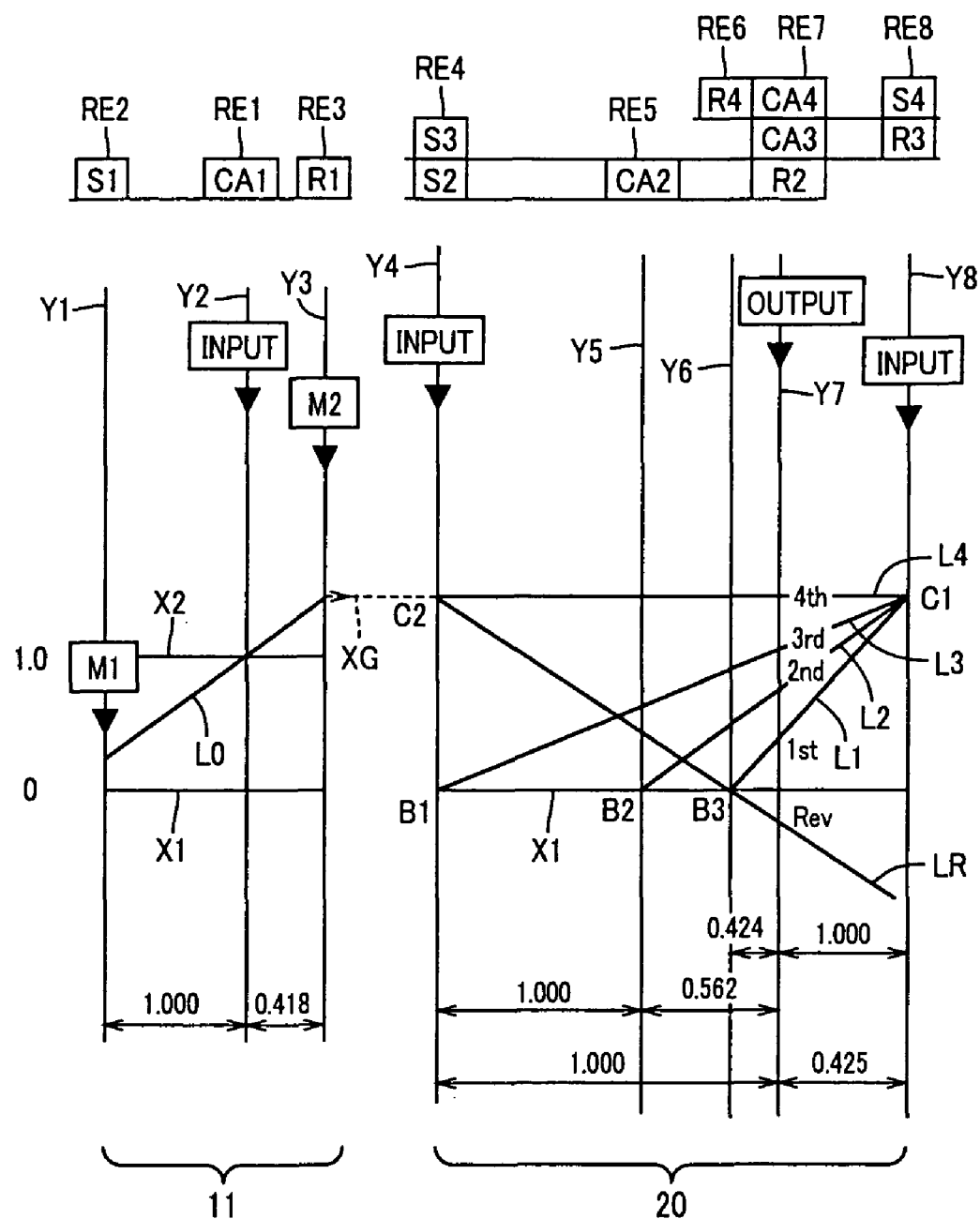
FIG. 3 is a collinear chart indicating mutually relative rotating speeds of rotary elements establishing various gear positions in the vehicle power transmitting apparatus shown in FIG. 1.

Now, various embodiments according to the present invention will be described below in detail with reference to the accompanying drawings.

First Embodiment 1

As shown in FIG. 1, the shifting mechanism 10 includes a transmission case 12, an input shaft 14, an electrically controlled differential portion 11, an automatic shifting portion 20, and an output shaft 22. In detail, the transmission case (hereinafter referred to as "a case 12") is mounted on a vehicle body as a non-rotary member, and the input shaft 14 is coaxially disposed inside the case 12 as an input rotary member. The electrically controlled differential portion 11 (hereinafter referred to as a "differential portion 11") is coaxially connected to the input shaft 14 either directly or indirectly via a pulsation absorbing damper (vibration damping device) not shown, and serving as a continuously variable shifting portion. The automatic shifting portion 20 is connected in series in a power transmitting path between the differential portion 11 and drive wheels 34 (see FIG. 7) through a power transmitting member 18 (power transmitting shaft). The output shaft 22 connected to the automatic shifting portion 20 and serving as an output rotary member.

The transmission mechanism 10 is suitably applied to an FR (front-engine and reverse-drive) type vehicle and mounted on a vehicle along a fore and aft direction thereof. The transmission mechanism 10 is disposed between an engine 8 and a pair of drive wheels 34. The engine 8 includes an internal combustion engine such as a gasoline engine or a diesel engine or the like and serves as a drive-power source. The engine 8 is directly connected to the input shaft 12 in series or indirectly through the pulsation absorbing damper (vibration damping device), not shown. This allows a vehicle drive force to be transferred from the engine 8 to the pair of drive wheels 34 in sequence through a differential gear device 32 (final speed reduction gear) (see FIG. 7) and a pair of drive axles. In the present embodiment, the shifting mechanism 10 of corresponds to a claimed vehicle power transmitting apparatus, and the power transmitting member 18 corresponds to a claimed output shaft.

With the transmission mechanism 10 of the illustrated embodiment, the engine 8 and the differential portion 11 are directly connected to each other. As used herein, the term "directly connected to each other" refers to a structure under which a direct connection is established between the associated component parts in the absence of a fluid-operated power transmitting device, such as a torque converter or a fluid coupling device or the like, and a connection including, for instance, the pulsation absorbing damper is involved in such a direction connection. It is noted that a lower half of the transmission mechanism 10, which is constructed symmetrically with respect to its axles, is omitted in FIG. 1. This is also true for the other embodiments of the invention described below.

The differential portion 11 includes a first electric motor M1, a power distributing mechanism 16, constructed in a mechanical mechanism for mechanically distributing an output of the engine 8 applied to the input shaft 14, and a second electric motor M2 operatively connected to the power transmitting member 18 to be unitarily rotate therewith. The power distributing mechanism 16 functions as a differential mechanism through which the engine output is distributed to the first electric motor M1 and the power transmitting member 18. In the illustrated embodiment, both the first and second electric motors M1 and M2 are so-called motor/generators each having a function to generate electric power. The first electric motor M1 has at least a function as an electric power generator for generating a reaction force. The second electric motor M2 has at least a function as a motor (electric motor) serving as a running drive power source to output a vehicle drive force. In the present invention, the differential portion 11 corresponds to a claimed electrically controlled differential portion, and the first electric motor corresponds to a claimed electric motor.

The power distributing mechanism 16 serving as the differential mechanism includes, as a major component, a first planetary gear set 24 of a single pinion type having a gear ratio ρ1 of about 0.418, for example. The first planetary gear set 24 has rotary elements (elements) composed of a first sun gear S1, a first planetary gear P1, a first carrier CA1 supporting the first planetary gear P1 to be rotatable about its axis and about the axis of the first sun gear S1, and a first ring gear R1 meshing with the first sun gear S1 through the first planetary gear P1. Where the numbers of teeth of the first sun gear S1 and the first ring gear R1 are represented by ZS1 and ZR1, respectively, the above gear ratio ρ1 is represented by ZS1/ZR1. In the present embodiment, the first planetary gear set 24 corresponds to a claimed planetary gear set.

In the power distributing mechanism 16, a first carrier CA1 is connected to the input shaft 14, i.e., the engine 8; a first sun gear S1 is connected to the first electric motor M1; and a first ring gear R1 is connected to the power transmitting member 18. With the power distributing mechanism 16 of such a structure, the three elements of the first planetary gear set 24, i.e., the first sun gear S1, the first carrier CA1 and the first ring gear R1 are arranged to rotate relative to each other for initiating a differential action, i.e., in a differential state under which the differential action is initiated. This allows the engine output to be distributed to the first electric motor M1 and the power transmitting mechanism 18. Then, a part of the distributed engine output drives the first electric motor M1 to generate electric energy, which is stored and used for rotatably driving the second electric motor M2.

Thus, the differential portion 11 (power distributing mechanism 16) is caused to function as an electric differential device such that, for instance, the differential portion 11 is placed in a so-called continuously variable shifting state (electrically established CVT state) to continuously vary the rotation of the power transmitting member 18, regardless of the engine 8 operating at a given rotation speed. That is, the differential portion 11 functions as an electrically controlled continuously variable transmission to provide a speed ratio γ0 (rotation speed $N_{IN}$ of the input shaft 14/rotation speed $N_{18}$ of the power transmitting member 18) that is continuously variable from a minimum value γ0min to a maximum value γ0max.

In this way, when the driving state of the first electric motor M1 connected to the power distributing mechanism 16 (differential portion 11) in a power transmissive state, the differential portion 11 is caused to act as the continuously variable shifting mechanism. That is, in the differential portion 11, the differential state between the rotation speed of the input shaft 14 to which power of the engine 8 is inputted, and the rotation speed of the power transmitting member 18 functioning as the output shaft.

The automatic shifting portion 20 is the step variable automatic transmission forming the part of the power transmitting path extending from the differential portion 11 to the drive wheel 38. It includes a single-pinion type second planetary gear set 26, a single-pinion type third planetary gear set 28 and a single-pinion type fourth planetary gear set 30. The automatic shifting portion 20 is a planetary gear type multiple-step transmission operable as a step-variable automatic transmission. The second planetary gear set 26 has a second sun gear S2; a second planetary gear P2; a second carrier CA2 supporting the second planetary gear P2 to be rotatable about its axis and about the axis of the second sun gear S2; and a second ring gear R2 meshing with the second sun gear S2 through the second planetary gear P2. For example, the second planetary gear set 26 has a given gear ratio ρ2 of about "0.562".

The third planetary gear set 28 has a third sun gear S3; a third planetary gear P3; a third carrier CA3 supporting the third planetary gear P3 to be rotatable about its axis and about the axis of the third sun gear S3; and a third ring gear R3 meshing with the third sun gear S3 through the third planetary gear P3. For example, the third planetary gear set 28 has a given gear ratio ρ3 of about "0.425".

The fourth planetary gear set 30 has a fourth sun gear S4; a fourth planetary gear P4; a fourth carrier CA4 supporting the fourth planetary gear P4 to be rotatable about its axis and about the axis of the fourth sun gear S4; and a fourth ring gear R4 meshing with the fourth sun gear S4 through the fourth planetary gear P4. For example, the fourth planetary gear set 30 has a given gear ratio ρ4 of, for instance, about "0.421". With the second sun gear S2, second ring gear R2, third sun gear S3, third ring gear R3, fourth sun gear S4 and fourth ring gear R4 having the numbers of gear teeth represented by ZS2, ZR2, ZS3, ZR3, ZS4 and ZR4, respectively, the gear ratios ρ2, ρ3 and ρ4 are expressed by ZS2/ZR2, ZS3/ZR3, and ZS4/ZR4, respectively.

In the automatic shifting portion 20, the second and third sun gears S2, S3 are integrally connected to each other, selectively connected to the power transmitting member 18 through a second clutch C2, and selectively connected to the casing 12 through a first brake B1. The second carrier CA2 is selectively connected to the casing 12 through a second brake B2, and the fourth ring gear R4 is selectively connected to the casing 12 through a third brake B3. The second ring gear R2, third carrier CA3 and fourth carrier CA4 are integrally connected to each other and connected to the output shaft 22. The third ring gear R3 and the fourth sun gear S4 are integrally connected to each other and selectively connected to the power transmitting member 18 through a first clutch C1.

Thus, the automatic shifting portion 20 and the differential portion 11 (power transmitting member 18) are selectively connected to each other through the first clutch C1 or the second clutch C2, which is provided to establish each gear position (shift gear position) in the automatic shifting portion 20. In other words, the first and second clutches C1, C2 function as coupling devices i.e., engaging device operable to place the power transmitting path between the power transmitting member 18 and the automatic shifting portion 20, that is, the power transmitting path between the differential portion 11 (power transmitting member 18) and the drive wheels 34, selectively in one of a power transmitting state in which the vehicle drive force can be transmitted through the power transmitting path, and the power cut-off state in which the vehicle drive force cannot be transmitted through the power transmitting path.

That is, with at least one of the first and second clutches C1 and C2 brought into coupling engagement, the power transmitting path is placed in the power transmitting state. In contrast, uncoupling both the first and second clutches C1 and C2 places the power transmitting path in the power cut-off state.

With the automatic shifting portion 20, further, uncoupling an on-uncoupling side coupling device while coupling an on-coupling side coupling device allows a so-called "clutch-to-clutch" shifting action to be executed for respective gear positions (shifting positions) to be selectively established. This allows a speed ratio γ (rotation speed $N_{18}$ of the power transmitting member 18/rotation speed $N_{OUT}$ of the output shaft 22) to be obtained in equally varying ratio i.e., geometrically ratio for each gear position. As indicated in the coupling operation table shown in FIG. 2, coupling the first clutch C1 and third brake B3 establishes 1st-speed gear position having a speed ratio γ1 of approximately, for instance, "3.357". With the first clutch C1 and second brake B2 coupled in operation, a 2nd-speed gear position is established with a speed ratio γ2 of, for instance, approximately "2.180", which is lower a value of the speed ratio γ1.

With the first clutch C1 and first brake B1 coupled in operation, a 3rd-speed gear position is established with a speed ratio γ3 of, for instance, approximately "1.424", which is lower a value of the speed ratio γ2. Coupling the first clutch C1 and second clutch C2 establishes a 4th-speed gear position with a speed ratio γ4 of, for instance, approximately "1.000", which is lower than the speed ratio γ3. Coupling the second clutch C2 and third brake B3 establishes a reverse-drive gear position (reverse-drive shift position) with a speed ratio γR of, for instance, approximately 3.209, which is intermediate between those of the 1st-speed gear position and the 2nd-speed gear position. In addition, uncoupling i.e., disengaging or releasing the first clutch C1, second clutch C2, first brake B1, second brake B2 and third brake B3 allows a neutral position N to be established.

The first clutch C1, second clutch C2, first brake B1, second brake B2 and third brake B3 (hereinafter collectively referred to as clutch C and brake B, unless otherwise specified) are hydraulically operated frictional coupling devices that are used in the related art vehicular automatic transmission. Each of these frictional coupling devices may include a wet-type multiple-disc clutch having a plurality of mutually overlapping friction plates adapted to be pressurized against each other by a hydraulic actuator, or a band brake including a rotary drum having an outer circumferential surface on which one band or two bands are wound with terminal ends being adapted to be tightened by a hydraulic actuator. Thus, the frictional coupling device serves to selectively provide a drive connection between two component parts between which each clutch or brake is interposed.

With the transmission mechanism 10 of such a structure, the differential portion 11 serving as the continuously variable transmission, and the automatic shifting portion 20 constitute a continuously variable transmission. Further, with the differential portion 11 controlled so as to provide a speed ratio kept at a fixed level, the differential portion 11 and the automatic shifting portion 20 can provide the same state as that of a step-variable transmission.

More particularly, the differential portion 11 functions as the continuously variable transmission, and the automatic shifting portion 20 connected to the differential portion 11 in series functions as the step-variable transmission. Thus, the rotation speed input to the automatic shifting portion 20 for at least one gear position M (hereinafter referred to as "input rotation speed of the automatic shifting portion 20"), i.e., the rotation speed of the power transmitting member 18 (hereinafter referred to as "transmitting-member rotation speed $N_{18}$") are caused to continuously vary, thereby enabling the gear position M to have a continuously variable speed range. Accordingly, the transmission mechanism 10 provides an overall speed ratio γT (rotation speed $N_{IN}$ of the input shaft 14/rotation speed $N_{OUT}$ of the output shaft 22) in a continuously variable range. Thus, the continuously variable transmission is established in the transmission mechanism 10. The overall speed ratio γT of the transmission mechanism 10 is the total speed ratio γT of the whole automatic shifting portion 20 that is established based on the speed ratio γ0 of the differential portion 11 and the speed ratio γ of the automatic shifting portion 20.

For the respective gear positions such as, for instance, the 1st-speed to 4th-speed gear positions and the reverse-drive gear position of the automatic shifting portion 20 as indicated in the coupling operation table shown in FIG. 2, the transmitting-member rotation speed $N_{18}$ is continuously varied with each gear position being obtained in a continuously variable speed width. Accordingly, a continuously variable speed ratio is present between adjacent gear positions, enabling the whole transmission mechanism 10 to have the total speed ratio γT continuously.

Further, the speed ratio γ0 of the differential portion 11 is controlled so as to lay at a fixed level and the clutch C and brake B are selectively coupled, thereby causing either one of the 1st-speed to 4th-speed gear positions or the reverse-drive gear position (reverse-drive shift position) to be selectively established. Control of the differential portion 11 and engagement of the clutch C and the brake B are performed by an electronic control unit 80 to be explained later. This allows the overall speed ratio γT, variable in a nearly equal ratio, of the transmission mechanism 10 to be obtained for each gear position. Thus, the transmission mechanism 10 can be established in the same state as that of the step-variable transmission.

For instance, if the differential portion 11 is controlled so as to provide the speed ratio γ0 at a fixed value of "1", the transmission mechanism 10 provides the total speed ratio γT for each gear position of the 1st-speed to 4th-speed gear positions and the reverse-drive gear position of the automatic shifting portion 20 as indicated by the coupling operation table shown in FIG. 2. Further, if the automatic shifting portion 20 is controlled under the 4th-speed gear position so as to cause the differential portion 11 to have the speed ratio γ0 of approximately, for instance, "0.7" less than a value of "1", the automatic shifting portion 20 has the total speed ratio γT of approximately, for instance, "0.7" that is less than a value of the 4th-speed gear position.

FIG. 3 is a collinear chart for the transmission mechanism 10 including the differential portion 11 and the automatic shifting portion 20, wherein the relative motion relationships among the rotation speeds of the various rotary elements in different coupling states for each gear position can be plotted on straight lines. The collinear chart of FIG. 3 takes the form of a two-dimensional coordinate system having the abscissa axis plotted with the gear ratios ρ of the planetary gear sets 24, 26, 28 and 30 and the ordinate axis plotted with the mutually relative rotating speeds of the rotary elements. A transverse line X1 indicates the rotation speed that is zeroed; a transverse line X2 the rotation speed of "1.0", that is, the rotating speed $N_E$ of the engine 8 connected to the input shaft 14; and a transverse line XG the rotation speed of the power transmitting member 18.

Starting from the left, three vertical lines Y1, Y2 and Y3, associated with the three elements of the power distributing mechanism 16 forming the differential portion 11, represent the mutually relative rotating speeds of the first sun gear S1 corresponding to a second rotary element (second element) RE2, the first carrier CA1 corresponding to a first rotary element (first element) RE1, and the first ring gear R1 corresponding to a third rotary element (third element) RE3, respectively. A distance between the adjacent vertical lines is determined based on the gear ratio ρ1 of the first planetary gear set 24.

Further, starting from the left, five vertical lines Y4, Y5, Y6, Y7 and Y8 for the automatic shifting portion 20 represent the mutually relative rotating speeds of the second and third sun gears S2, S3, connected to each other, which corresponds to a fourth rotary element (fourth element) RE4; the second carrier CA2 corresponding to a fifth rotary element (fifth element) RE5; the fourth ring gear R4 corresponding to a sixth rotary element (sixth element) RE6; the second ring gear R2, third carriers CA3 and fourth carriers CA4, connected to each other, which correspond to a seventh rotary element (seventh element) RE7; and the third ring gear R3 and fourth sun gear S4 connected to each other and corresponding to an eighth rotary element (eighth element) RE8, respectively. Each distance between the adjacent vertical lines is determined based on the gear ratios ρ2, ρ3 and ρ4 of the second, third and fourth planetary gear sets 26, 28 and 30.

In the relationship among the vertical lines on the collinear chart, if a space between the sun gear and carrier is set to a distance corresponding to a value of "1", then, a space between the carrier and ring gear lies at a distance corresponding to the gear ratio ρ of the planetary gear set. That is, for the differential portion 11, a space between the vertical lines Y1 and Y2 is set to a distance corresponding to a value of "1" and a space between the vertical lines Y2 and Y3 is set to a distance corresponding to the gear ratio ρ1. For the automatic shifting portion 20, further, the space between the sun gear and carrier is set to the distance corresponding to the value of "1" for each of the second, third and fourth planetary gear sets 26, 28 and 30, for which the space between the carrier and ring gear is set to the distance corresponding to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is connected to the input shaft 14, i.e., the engine 8, and the second rotary element RE2 is connected to the first electric motor M1. The third rotary element RE3 (first ring gear R1) is connected to the power transmitting member 18 and the second electric motor M2. Thus, a rotary motion of the input shaft 14 is transmitted (input) to the automatic shifting portion 20 through the power transmitting member 18. A relationship between the rotation speeds of the first sun gear S1 and the first ring gear R1 is represented by an inclined straight line L0 which passes across a point of intersection between the lines Y2 and X2.

Now, description is made of a case in which, for example, the differential portion 11 is placed in a differential state with the first to third rotary elements RE1 to RE3 enabled to rotate relative to each other, while the rotation speed of the first ring gear R1 indicated at an intersecting point between the straight line L0 and the vertical line Y1 is bound with the vehicle speed V and remains at a nearly constant level. In this case, as the engine rotation speed $N_E$ is controlled with the rotation speed of the first carrier CA1, as represented by an intersecting point between the straight line L0 and the vertical line Y2, being raised or lowered, the rotation speed of the first sun gear S1, i.e., the rotation speed of the first electric motor M1, indicated by an intersecting point between the straight line L0 and the vertical line Y1, is raised or lowered.

On controlling the rotation speed of the first electric motor M1 so as to allow the differential portion 11 to have the speed ratio γ0 of "1" with the first sun gear S1 rotating at the same speed as the engine rotation speed $N_E$, the straight line L0 is aligned with the horizontal line X2. When this takes place, the first ring gear R1, i.e., the power transmitting member 18, is caused to rotate at the same speed as the engine rotation speed $N_E$. On the contrary, if the rotation speed of the first electric motor M1 is controlled so as to allow the differential portion 11 to have the speed ratio γ0 of a value less than "1", for instance, a value of approximately "0.7" with the rotation speed of the first sun gear S1 being zeroed, the power transmitting member 18 is caused to rotate at an increased transmitting-member rotation speed $N_{18}$ higher than the engine rotation speed $N_E$.

In the automatic shifting portion 20, the fourth rotary element RE4 is selectively connected to the power transmitting member 18 via the second clutch C2 and selectively connected to the casing 12 via the first brake B1, with the fifth rotary element RE5 being selectively connected to the casing 12 via the second brake B2. The sixth rotary element RE6 is selectively connected to the casing 12 via the third brake B3 with the seventh rotary element RE7 connected to the output shaft 22, and the eighth rotary element RE8 is selectively connected to the power transmitting member 18 via the first clutch C1.

In the automatic shifting portion 20, rotation of the power transmitting member 18 (third rotary element RE3) which is the input rotation member is input to the eighth rotary element RE8 by engagement of the first clutch C1 in the differential portion 11. When the first clutch C1 and the third brake B3 are engaged, the rotation speed of the output shaft 22 for the 1st-speed gear position is represented by an intersecting point between the inclined line L1, and an intersecting point intersecting the vertical line Y7 indicative of the rotation speed of the seventh rotary element RE connected to the output shaft 22 as indicated in FIG. 3. Here, the inclined line L1 passes across an intersecting point between the vertical line Y8 indicative of the rotation speed of the eighth rotary element RE8 and the horizontal line XG, and a point of intersection between the vertical line Y6 indicative of the rotation speed of the sixth rotary element RE6, and the horizontal line X1.

Similarly, the rotation speed of the output shaft 22 for the 2nd-speed gear position is represented by an intersecting point between an inclined straight line L2, determined when the first clutch C1 and second brake B2 are coupled, and the vertical line Y7 indicative of the rotation speed of the seventh rotary element RE7 connected to the output shaft 22. The rotation speed of the output shaft 22 for the 3rd-speed gear position is represented by an intersecting point between an inclined straight line L3, determined with the first clutch C1 and first brake B1 being coupled, and the vertical line Y7 indicative of the rotation speed of the seventh rotary element RE7 connected to the output shaft 22. The rotation speed of the output shaft 22 for the 4th-speed gear position is represented by an intersecting point between a horizontal straight line L4, determined with the first clutch C1 and second brake B2 being coupled, and the vertical line Y7 indicative of the rotation speed of the seventh rotary element RE7 connected to the output shaft 22.

Figure 4:
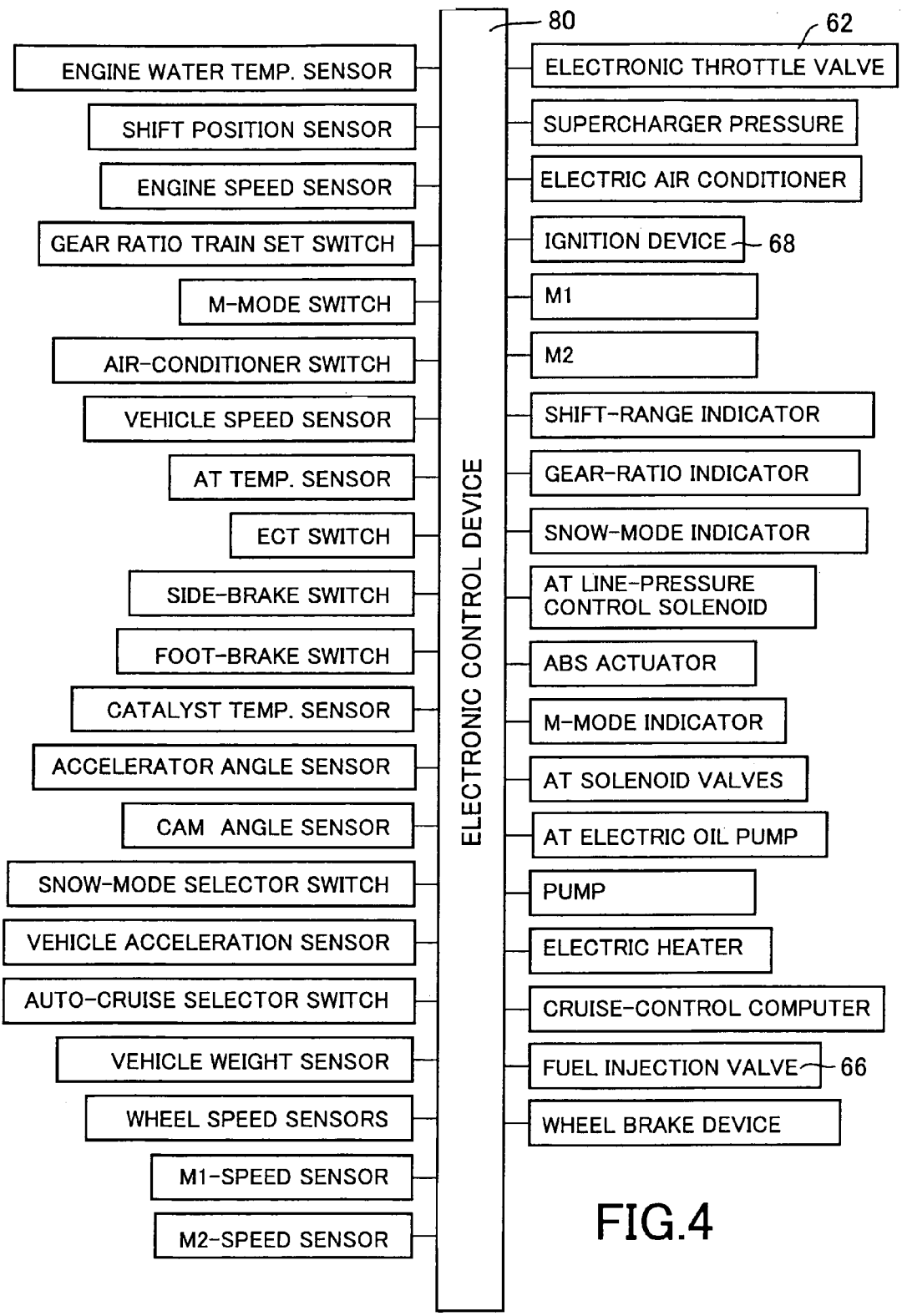
FIG. 4 is a view showing an electronic control unit with input and output signals associated therewith which is provided in the vehicle power transmitting apparatus shown in FIG. 1.

FIG. 4 shows an electronic control unit 80 operative to control the transmission mechanism 10 of the present embodiment for generating various output signals in response to various input signals. The electronic control unit 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first and second electric motors M1 and M2, and drive controls such as shifting controls of the automatic shifting portion 20.

The electronic control unit 80, connected to various sensors and switches as shown in FIG. 4, receives various signals such as: a signal indicative of an engine coolant temperature $TEMP_W$; a signal indicative of a shift position $P_{SH}$ selected with a shift lever 52 (shown in FIG. 6) and a signal indicative of the number of operations initiated on the "M" position; a signal indicative of the engine rotation speed $N_E$ representing the rotation speed of the engine 8; a signal indicative of a gear train preset value (drive-position group selector switch); a signal commanding an M mode (manual shift running mode); a signal indicative of an operated state of an air conditioner; a signal indicative of the rotation speed (hereinafter referred to as "output shaft speed") $N_{OUT}$ of the output shaft 22; a signal indicative of a temperature $T_{OIL}$ of working oil of the automatic shifting portion 20; and a signal indicative of a side brake under operation.

Figure 7:
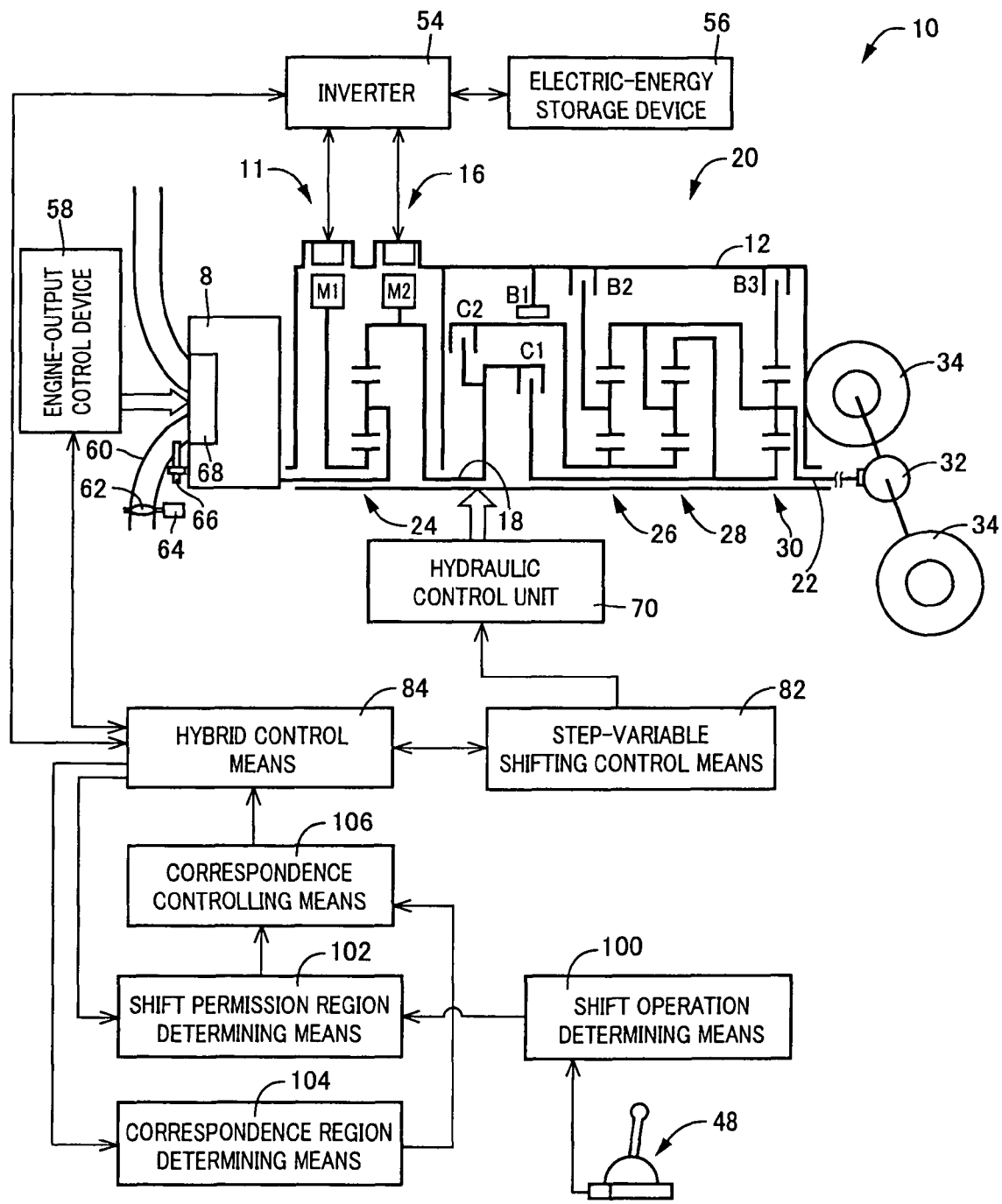
FIG. 7 is a functional block diagram illustrating major control functions of the electronic control unit of FIG. 4.

The electronic control unit 80 also receives a signal indicative of a foot brake under operation; a signal indicative of a temperature of a catalyst; a signal indicative of an accelerator opening Acc representing an operating stroke of an accelerator pedal when manipulated by a driver for his output demand value; a signal indicative of a cam angle; a signal indicative of a snow mode under setting; a signal indicative of a fore and aft acceleration value G of the vehicle; a signal indicative of an auto-cruising drive mode; a signal indicative of a vehicle weight; a signal indicative of a wheel velocity of each drive wheel; a signal indicative of a rotation speed $N_{M1}$ of the first electric motor M1 (hereinafter referred to as "first-electric motor speed $N_{M1}$ as required); a signal indicative of a rotation speed $N_{M2}$ of the second electric motor M2 (hereinafter referred to as "second-electric motor speed $N_{M2}$ as required); and a signal indicative of a charged capacity (charged state) of charge SOC stored in an electric-energy storage device 60 (see FIG. 7).

The electronic control unit 80 generates various signals including: a control signal applied to an engine output control device 58 (see FIG. 7) for controlling an engine output, i.e., a drive signal applied to a throttle actuator 64 for controlling a throttle valve opening $θ_{TH}$ of an electronic throttle valve 62 disposed in an intake manifold 60 of the engine 8; a fuel supply quantity signal applied to a fuel injecting device 66 for controlling an amount of fuel injected into the intake manifold 60 or cylinders of the engine 8; an ignition signal applied to an ignition device 68 to control the ignition timing of the engine 8; a supercharger pressure regulation signal for regulating a supercharger pressure of the engine 8; an electric air-conditioner drive signal for actuating an electric air-conditioner; command signals for commanding the operations of the first and second electric motors M1 and M2; a shift-position (manipulated position) display signal for actuating a shift-range indicator; a gear-ratio displaying signal for displaying the gear ratio; snow-mode display signal for displaying the presence of a snow-mode.

The electronic control unit 80 also generates an ABS actuation signal for operating an ABS actuator to preclude slippages of the drive wheels during a braking phase; an M-mode display signal for displaying an M-mode being selected; valve command signals for actuating electromagnetic valves (linear solenoid valves), incorporated in the hydraulic control unit 70 (see FIGS. 5 and 7) for controlling the hydraulic actuators of the hydraulically operated frictional coupling devices of the differential portion 11 and automatic shifting portion 20; a signal for regulating a regulator valve (pressure regulator valve), incorporated in the hydraulic control unit 70, to regulate a line pressure $P_L$; a drive command signal for actuating an electric hydraulic pump acting as a hydraulic original-pressure source for the line pressure $P_L$ to be regulated; a signal for driving an electric heater; and a signal applied to a cruise-control computer.

Figure 5:
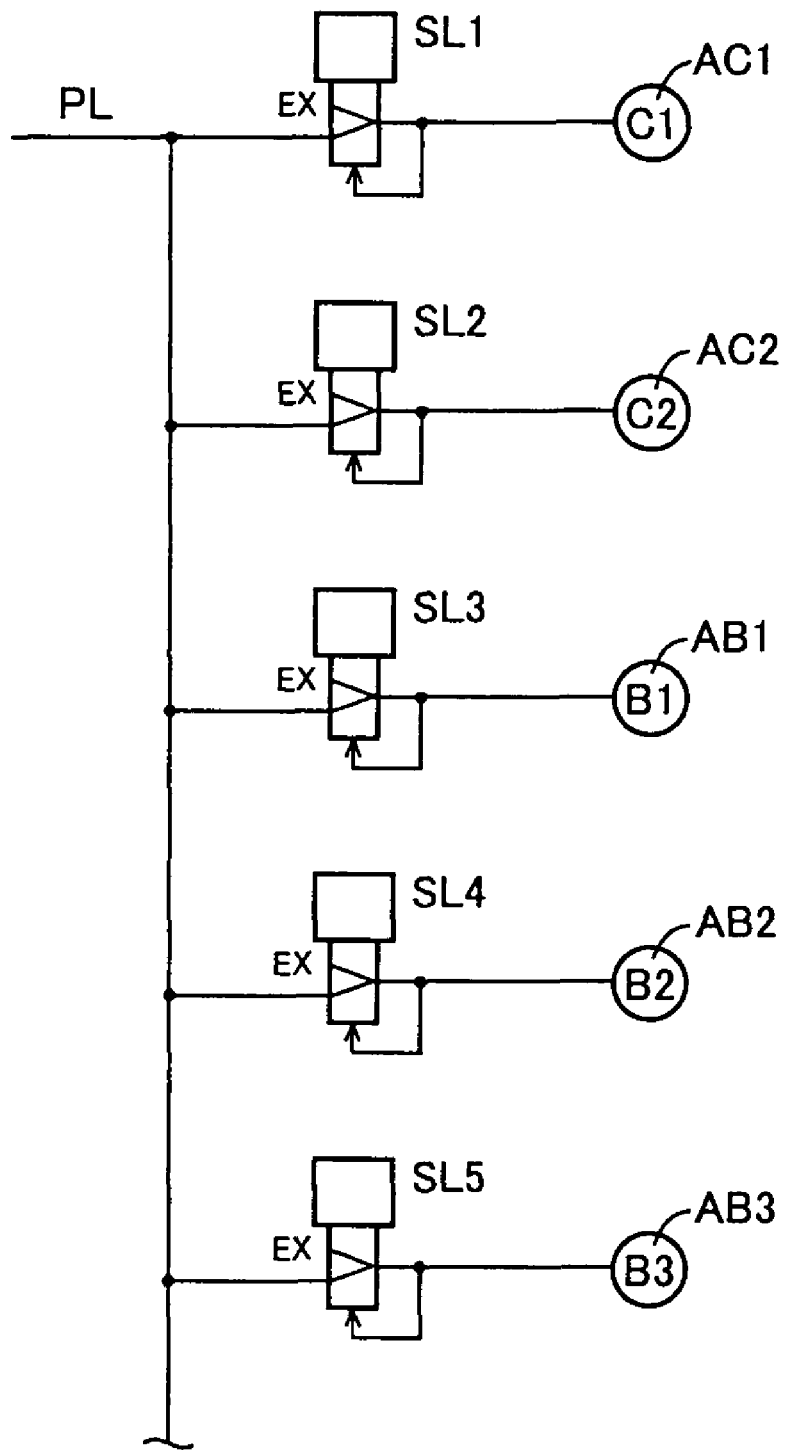
FIG. 5 is a circuit diagram showing a major portion of a hydraulic control circuit associated with linear solenoid valves arranged to control operations of respective hydraulic actuators of clutches C and brakes B.

FIG. 5 is a circuit diagram related to linear solenoid valves SL1 to SL5 of the hydraulic control circuit 70 for controlling the operations of respective hydraulic actuators (hydraulic cylinders) AC1, AC2, AB1, AB2, AB3 of the clutches C1, C2 and brakes B1 to B3.

As shown in FIG. 5, the hydraulic actuators AC1, AC2, AB1, AB2, AB3 are connected to the respective linear solenoid valves SL1-SL5, which are controlled in response to control commands, delivered from the electronic control unit 80. This adjusts the line pressure PL into respective clutch engaging pressures PC1, PC2, PB1, PB2 and PB3 to be applied directly to the respective hydraulic actuators AC1, AC2, AB1, AB2, AB3. The line pressure $P_L$ represents an original hydraulic pressure, generated from an electrically operated hydraulic oil pump (not shown) or a mechanical oil pump driven by the engine 30, which is regulated by a relief-type pressure regulator valve depending on a load of the engine 8 in terms of an accelerator opening displacement $A_{CC}$ or a throttle valve opening $θ_{TH}$.

The linear solenoid valves SL1 to SL5, fundamentally formed in the same structure, are independently energized or de-energized with the electronic control unit 80. This allows the hydraulic actuators AC1, AC2, AB1, AB2, AB3 to independently and controllably regulate hydraulic pressures, thereby controlling the engaging pressures PC1, PC2, PB1, PB2, PB3 of the clutches and the brakes. With the automatic shifting portion 20, predetermined coupling devices are coupled in a pattern indicated on, for instance, the coupling-operation indicating table shown in FIG. 2, thereby establishing various gear positions. In addition, during the shifting control of the automatic shifting portion 20, a so-called clutch-to-clutch shifting is executed to simultaneously control the coupling or uncoupling of the clutches C and the brakes B relevant to the shifting operations.

Figure 6:
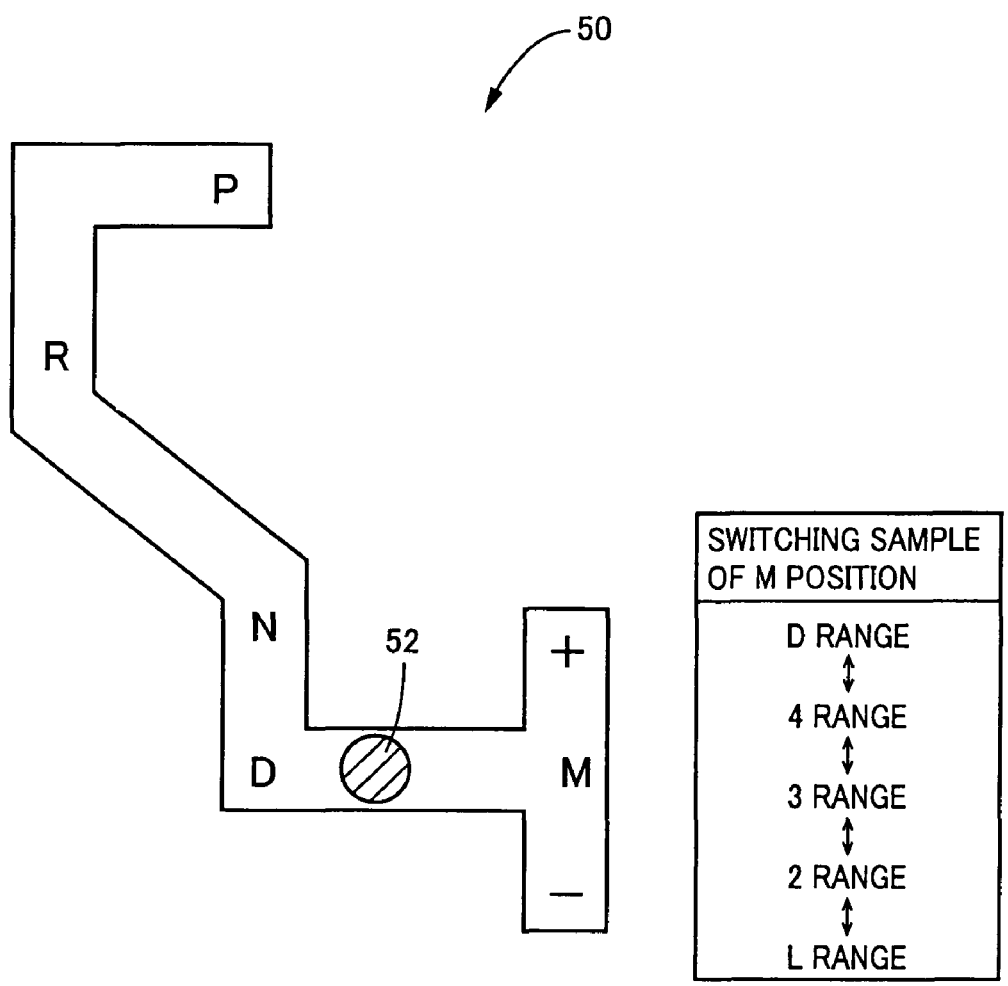
FIG. 6 is a view showing one example of a manually operated shifting device including a shift lever and operable to select one of a plurality of shift positions of multiple kinds.

FIG. 6 is a view showing one example of a manually operated shifting device 50 serving as a changeover device operative to shift multiple kinds of shift positions $P_{SH}$ on manual operation. The shifting device 50 is mounted in, for instance, an area lateral to a driver's seat and includes a shift lever 52 to be manipulated for selecting one of the plurality of shift positions $P_{SH}$.

The shift lever 52 has a structure that can be manually selected to a parking position "P (Parking)", a reverse drive position "R (Reverse)", a neutral position "N (Neutral)", a forward-drive automatic-shift drive position "D (Drive)" or a forward-drive manual-shift position "M (Manual)". Among these, the "P" position represents a position in which an internal path of the transmission mechanism 10, i.e., the power transmitting path inside the automatic shifting portion 20 is shut off in a neutrality, i.e., in a neutral condition, with the output shaft 22 of the automatic shifting portion 20 remained in a locked state. The "R" position represents a position for a reverse-drive mode. The "N" position represents a position in which the power transmitting path of the transmission mechanism 10 is shut off in a neutral state.

The "D" position represents a position for an automatic shift mode to be established to perform an automatic shift control within a variable range of a shiftable total speed ratio γT of the transmission mechanism 10 obtained by various gear positions that are subjected to the automatic shift control within an infinitely variable speed ratio of the differential portion 11 and a range selected from the 1st-speed to the 4th-speed gear positions of the automatic shifting portion 20. The "M" position represents a position for a manual-shift forward-drive mode (manual mode) to be established for a so-called shift range that limits a shifting gear position on a high-speed gear range during the operation of the automatic shifting portion 20 under the automatic shift control.

As the shift lever 52 is shifted to each of the various shift positions $P_{SH}$, the hydraulic control circuit 70 is electrically switched, thereby obtaining the reverse-drive "R" gear position, the neutral position "N" and the various gear shift positions or the like in the forward-drive gear position "D", shown in FIG. 2.

Among the various shift positions $P_{SH}$ represented in the "P" to "M" positions, the "P" and "N" positions represent non-running positions selected when no vehicle is caused to run. That is, the "P" and "N" positions represent non-drive positions selected when the first and second clutches C1 and C2 select to cause the power transmitting path to be switched to a power cut-off state like a situation where as indicated in, for instance, the coupling operation indicating table shown in FIG. 2, both the first and second clutches C1 and C2 are uncoupled to interrupt the power transmitting path inside the automatic shifting portion 20 so as to disenable the driving of the vehicle.

The "R", "D" and "M" positions represent running positions selected when the vehicle is caused to run. That is, these positions represent drive positions selected when the first clutch C1 and/or second clutch C2 select to cause the power transmitting path to be switched to a power transmitting state like a situation where as indicated in, for instance, the coupling operation indicating table shown in FIG. 2, at least one of the first and second clutches C1 and C2 is coupled to establish the power transmitting path inside the automatic shifting portion 20 so as to enable the vehicle to be driven.

More particularly, as the shift lever 52 is manually shifted from the "P" position or the "N" position to the "R" position, the second clutch C2 is coupled to cause the power transmitting path of the automatic shifting portion 20 to be switched from the power cut-off state to the power transmitting state. With the shift lever 52 manually shifted from the "N" position to the "D" position, at least the first clutch C1 is coupled to switch the power transmitting path of the automatic shifting portion 20 from the power cut-off state to the power transmitting state.

Further, as the shift lever 52 is manually shifted from the "R" position to the "P" or "N" position, the second clutch C2 is uncoupled to switch the power transmitting path of the automatic shifting portion 20 from the power transmitting state to the power cut-off state. With the shift lever 52 manually shifted from the "D" position to the "N" position, the first clutch C1 or second clutch C2 is uncoupled to switch the power transmitting path of the automatic shifting portion 20 from the power transmitting state to the power cut-off state.

For example, position "M" mentioned above is located at the same position as position "D" mentioned above in the front-back direction of the vehicle, and is next to position "D" in the width direction of the vehicle. "M" is the manual shift position where any one of from range "D" to range "L" is selected in accordance with the operation of the shift lever. In more detail, position "M" is provided with upshift position "+" and downshift position "−" in the front-back direction of the vehicle. When the shift lever 52 is operated toward upshift position "+" or downshift position "−," switching is performed among the ranges of from range "D" to range "L."

For example, the five shift ranges of range "D" to range "L" in position "M" are shift ranges differing in total speed ratio $\gamma T$ on the high-speed side (i.e., on the side of minimum speed ratio) in the variable range of the total speed ratio $\gamma T$ in which the transmission mechanism 10 can be automatically shifted. Additionally, these five shift ranges restrict the shift range of gear positions (shifting positions i.e. speed positions) so that the gear positions on the maximum speed side where the automatic shifting portion 20 can be shifted become different. In other words, gear positions of the automatic shifting portion 20 are shifted in accordance with a shift range specified by a shift position $P_{SH}$.

The shift lever 52 is automatically returned by an urging means, such as a spring, to position "M" from upshift position "+" and downshift position "−" mentioned above. The shift operation device 50 is provided with a shift position sensor (not shown) used to detect each shift position of the shift lever 52, which outputs the shift position of the shift lever 52 or the number of operations in position "M" to the electronic control device 80.

FIG. 7 is a functional block diagram illustrating major control functions to be executed by the electronic control device 80. The electronic control device 80 controls step-variable shift control means 82, hybrid control means 84, shift position determining means 88, rotation speed determining means 90 and engine upper limit rotation speed setting means. In particular, the step-variable shift control means 82 determines whether to execute a shifting, i.e., determines a gear position to be shifted in the automatic shifting portion 20 based on a vehicle condition, represented by an actual vehicle speed V and demanded output torque $T_{OUT}$ of the automatic shifting portion 20 by referring to the relationship (shifting lines and shifting map) shown in FIG. 8. The step-variable shift control means 82 executes the automatic shift control of the automatic shifting portion 20 so as to obtain the gear position which is determined. The relationship, shown in FIG. 8, has upshift lines (in solid lines) and downshift lines (in single dot lines) that are preliminarily stored in terms of parameters such as the vehicle speed V and output torque $T_{OUT}$ of the automatic shifting portion 20.

When this takes place, the step-variable shifting control means 82 outputs commands (a shift output command, a hydraulic pressure command) to the hydraulic control circuit 70 for coupling and/or uncoupling the hydraulically operated frictional coupling devices, involved in the shifting of the automatic shifting portion 20 so as to establish the gear position in accordance with the coupling table shown in FIG. 2. That is, the step-variable shifting control means 82 outputs a command to the hydraulic control circuit 70 for uncoupling the on-uncoupling side coupling device, involved in the shifting, while coupling the on-coupling side coupling device to cause the clutch-to-clutch shifting to be executed. Upon receipt of such commands, the hydraulic control circuit 70 causes the linear solenoid valves SL thereof to be actuated. This allows the hydraulically operated actuators of the hydraulically operated frictional coupling devices, involved in the relevant shifting, to be actuated. Thus, for instance, the on-uncoupling side coupling device is uncoupled and the on-coupling side coupling device is coupled, causing the automatic shifting portion 20 to execute the shifting.

Hybrid control means 84 operates the engine 8 in an optimum operating region at a high efficiency while varying distribution of the drive forces of the engine 8 and the second electric motor M2 at optimum rates and optimally varying a reacting force of the first electric motor M1 during the operation thereof, thereby controllably operating the differential portion 11 under an electrically controlled continuously variable transmission to control a speed ratio $\gamma 0$. At a vehicle speed V during the running of the vehicle in one occasion, for instance, a target (demanded) output for the vehicle is calculated based on the accelerator opening Acc and the vehicle speed V both of which represent output demanded variables of the driver, after which a demanded total target output is calculated based on the target output of the vehicle and a battery charge demanded value.

Subsequently, a target engine output is calculated in consideration of a loss in power transmission, loads of auxiliary units, assist torque of the second electric motor M2 or the like so as to obtain the total target output. Then, the hybrid control means 84 controls the engine 8, while controlling a rate of electric power being generated by the first electric motor M1, so as to obtain the engine rotation speed $N_E$ and engine torque $T_E$ such that the target engine output is obtained.

The hybrid control means 84 executes such controls in consideration of, for instance, the gear position of the automatic shifting portion 20 with a view to increasing a dynamic performance and improving fuel consumption. During such hybrid controls, the differential portion 11 is caused to operate as the electrically controlled continuously variable transmission such that the engine rotation speed $N_E$ and the vehicle speed V, determined for the engine 8 to operate in the operating region at a high efficiency, match the vehicle speed and the rotation speed of the power transmitting member 18 determined with the gear position in the automatic shifting portion 20.

Figure 9:
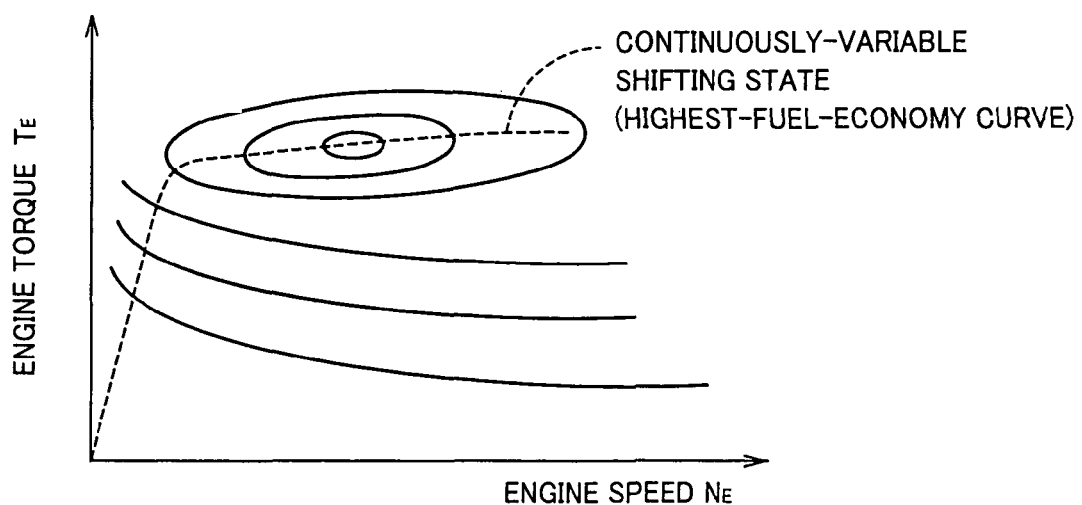
FIG. 9 shows in a dotted line an optimum fuel curve of an engine which is one example of a fuel map.

That is, the hybrid control means 84 determines a target value of the total speed ratio γT of the transmission mechanism 10 such that the engine 8 is caused to operate along an optimal fuel efficiency curve (a fuel efficiency map and the relationships) of the engine 8 as indicated by a dotted line in FIG. 9 which is preliminarily and experimentally obtained and prestored. This achieves a compromise between driveability and fuel consumption during the running of the vehicle under a continuously variable shifting mode on a two-dimensional coordinate established with the engine rotation speed $N_E$ and output torque (engine torque) $T_E$ of the engine 8. For instance, the target value of the total speed ratio γT of the transmission mechanism 10 is determined so as to obtain engine torque $T_E$ and the engine rotation speed $N_E$ for generating the engine output demanded for satisfying target outputs (a total target output and demanded drive torque.

When this takes place, the hybrid control means 84 allows electric energy, generated by the first electric motor M1, to be supplied through an inverter 54 to a battery device 56 and the second electric motor M2. Thus, a major part of drive power of the engine 8 is mechanically transferred to the power transmitting member 18. Equipment, involved in the operations starting from the step of generating electric power to the step of causing the second electric motor M2 to consume resultant electric energy, establishes an electric path in which the part of the drive power of the engine 8 is converted into electric energy and resultant electric energy is converted into mechanical energy.

The hybrid control means 84 allows the differential portion 11 to perform an electrically controlled CVT function for controlling, for instance, a first-electric-motor rotation speed $N_{M1}$ and/or a second-electric-motor rotation speed $N_{M2}$ to maintain the engine rotation speed $N_E$ at a nearly constant level or to control the rotation speed at an arbitrary level, regardless of the vehicle remaining under a halted condition or a running condition. In other words, the hybrid control means 84 controls the first-electric-motor rotation speed $N_{M1}$ and/or the second-electric-motor rotation speed $N_{M2}$ at an arbitrary level while maintaining the engine rotation speed $N_E$ at the nearly constant level or the arbitrary rotation speed.

As will be apparent from the collinear chart shown in FIG. 3, for instance, when raising the engine rotation speed $N_E$ during the running of the vehicle, the hybrid control means 84 raises the first-electric-motor rotation speed $N_{M1}$ while maintaining a second-electric-motor rotation speed $N_{M2}$ at a nearly fixed level that is bound with the vehicle speed V (represented by the drive wheels 34). In addition, when maintaining the engine rotation speed $N_E$ at the nearly fixed level during the shifting of the automatic shifting portion 20, the hybrid control means 84 varies the first-electric-motor rotation speed $N_{M1}$ in a direction opposite to that in which the second-electric-motor rotation speed $N_{M2}$ varies with the shifting of the automatic shifting portion 20 while maintaining the engine rotation speed $N_E$ at the nearly fixed level.

The hybrid control means 84 functionally has an engine output control means that controls the power output of the engine 8. In other words, for throttle control, the hybrid control means 84 allows the throttle actuator 64 to controllably open or close the electronic throttle valve 62. In addition, for fuel injection control, the hybrid control means 84 allows the fuel injection device 66 to control the fuel injection quantity or the fuel injection timing. In addition, for ignition timing control, a command to control the ignition timing of the ignition device 68, such as an igniter, is issued to the engine output control device 58 in a sole or combined manner. Necessary engine power is output in this way.

For example, the hybrid control means 84 drives the throttle actuator 64 based on an accelerator opening $A_{CC}$ basically with a prestored relationship (not shown), and performs throttle control so that a throttle-valve opening $\theta_{TH}$ is increased in proportion to an increase in the accelerator opening $A_{CC}$. The engine output control device 58 performs engine torque control. In more detail, according to a command issued by the hybrid control means 84, for throttle control, the electronic throttle valve 62 is controllably opened or closed by the throttle actuator 64. In addition, for fuel injection control, the fuel injection of the fuel injection device 66 is controlled, and, for ignition timing control, the ignition timing of the ignition device 68, such as an igniter, is controlled.

Further, the hybrid control means 84 is operative to cause the differential portion 11 to perform the electrically controlled CVT function (differential action) to achieve the motor drive mode regardless of the engine 8 remaining under the halted condition or an idling state. The hybrid control means 84 executes the motor-drive running mode in a relatively low output torque range $T_{OUT}$, regarded to be generally lower in engine efficiency than that of the engine operating in a high output torque area i.e., a low engine torque $T_E$ area, or a relatively low vehicle speed area of the vehicle speed V, i.e., a low load area.

In order to suppress a drag of the engine 8 being halted for improving fuel consumption during such a motor-drive running mode, the hybrid control means 84 controls the first-electric-motor rotation speed $N_{M1}$ in a negative rotation speed. Thus, the first electric motor M1 is placed under an unloaded condition, thereby being idly rotated. By so doing, the engine rotation speed $N_E$ is zeroed or nearly zeroed depending on needs by the electrically controlled CVT function (differential action) of the differential portion 11.

The hybrid control means 84 operates to supply electric energy from the first electric motor M1 by the electrical path and/or electric energy from the battery device 56 to the second electric motor M2 even in an engine running area. A torque is given to the drive wheel 34 while driving the second electric motor M2 in this way, whereby a so-called torque assist can be performed to assist the power of the engine 8.

The hybrid control means 84 operates to bring the first electric motor M1 into a no-load state to thereby run freely, i.e., to idle. As a result, a state is reached in which the differential portion 11 can not transfer the torque. In other words, the power transmitting path in the differential portion 11 is brought into the same state as a blocked state, impossible to produce the output therefrom. That is, the hybrid control means 84 operates to bring the first electric motor M1 into a no-load state, to bring the differential portion 11 into a neutral state in which the power transmitting path of the differential portion 11 is electrically cut off.

To improve fuel consumption, during coast running with an accelerator-off state or during braking with a foot brake, the hybrid control means 84 operates to cause the second electric motor M2 to act as an electric generator while being rotationally driven by the kinetic energy of the vehicle, i.e., by a reverse driving force transmitted from the drive wheel 34 toward the engine 8. Thus, the hybrid control means 84 functions as a regeneration control means that charges the battery device 56, with an electric current generated by the second electric motor M2 through the inverter 54. This regeneration control is performed to have a regenerative amount determined based on, for example, the braking force distribution of a braking force by an oil hydraulic brake to obtain a braking force corresponding to the operation amount of the brake pedal, or to the charging capacity SOC of the battery device 56.

Figure 8:
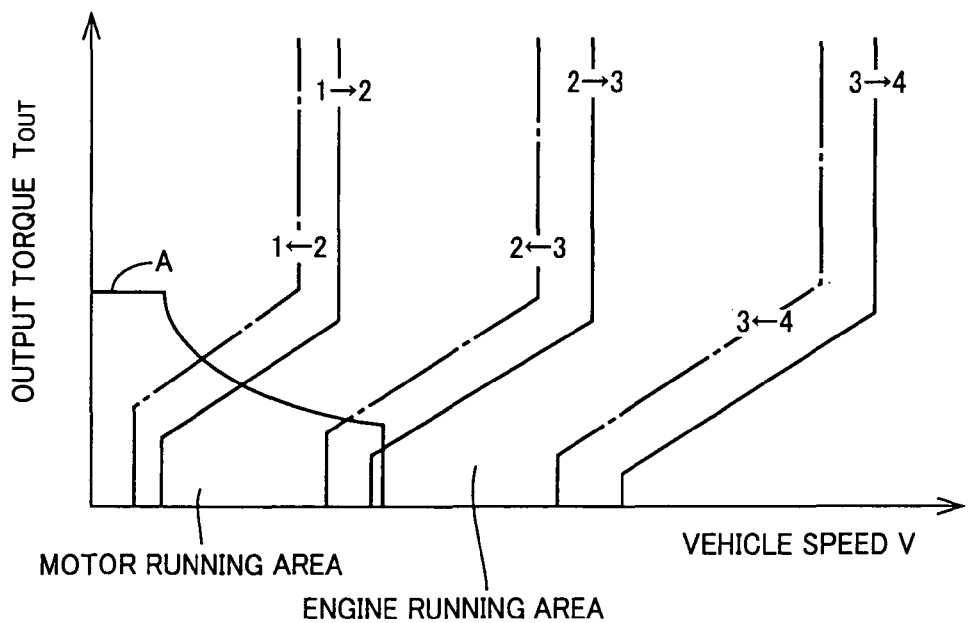
FIG. 8 is a view illustrating one example of a shifting map for use in performing a shifting control of the drive system and one example of drive-power-source map defining boundary lines for use in a drive-power-source switching control between an engine-drive mode and a motor-drive mode with those maps being related to each other.

In the shifting map of FIG. 8, there is an operating region which restricts (prohibits) the shifting of the automatic shifting portion 20 so that rotation speeds of the first electric motor M1 or the first planetary gear P1 do not exceed the range of the allowable rotation speed during shifting. Here, for example, the durability of the first electric motor M1 or the first planetary gear P1 of the first planetary gear set 24 constructing the differential-portion 11 is considered. The range of the allowable rotation speed of the first electric motor M1 and that of the first planetary gear P1 are experimentally pre-calculated by an endurance test or the like, and are set within a rotation speed range in which sufficient durability can be maintained.

Figure 10:
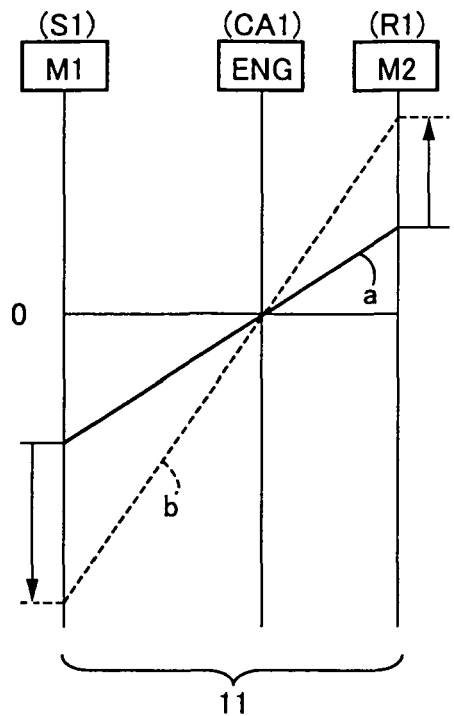
FIG. 10 is a collinear chart showing the relative rotation speed of each rotary element of a first planetary gear set serving as a part of a differential portion.

FIG. 10 is a collinear chart showing the relative rotation speed of each rotary element of the first planetary gear set 24 constructing the differential portion 11, and corresponds to the left part of FIG. 3. In FIG. 10, reference character M1 designates the rotation speed $N_{M1}$ of the first electric motor M1 connected to the first sun gear S1, reference character M2 designates the rotation speed $N_{M2}$ of the second electric motor M2 connected to the first ring gear R1, and reference character ENG designates the rotation speed $N_E$ of the engine 8 connected to the first carrier CA1.

For example, in a running state shown by the solid line "a," i.e., in a motor running state by the driving torque of the second electric motor M2, when the shifting portion is shifted down to range "L" by receiving a command for shifting by a manual shift operation, the gear position of the automatic shifting portion 20 is changed to the first gear. Thus, the rotation speed $N_{M2}$ of the second electric motor M2 increases as shown by the broken line "b." Accordingly, the first electric motor M1 is rotated at the high speed in the negative rotational direction (reverse direction) in the rotation speed $N_{M1}$ by the differential operation of the power distributing mechanism 16, reaching a high-speed rotation. If shifting is performed in this operating region, there is a fear that the rotation speed $N_{M1}$ of the first electric motor M1 exceeds the allowable rotation speed range to lower the durability of the first electric motor M1. To prevent this, the shifting of the automatic shifting portion 20 by the manual shift operation is restricted (prohibited).

When a rotation speed difference (i.e., relative rotation speed) increases between the rotation speed $N_{R1}$ of the first ring gear R1 of the first planetary gear set 24 (i.e., rotation speed $N_{18}$ of the power transmitting member 18), and the rotation speed $N_{CA1}$ of the first carrier CA1 (i.e., rotation speed $N_E$ of the engine 8), the rotation speed $N_{P1}$ of the first planetary gear P1 becomes high. Accordingly, for example, if the automatic shifting portion 20 is shifted down to range "L" by receiving a command for shifting by the manual shift operation, the gear position of the automatic shifting portion 20 is changed to the first gear, and the rotation speed of the power transmitting member 18, i.e., the rotation speed of the first ring gear R1 increases. As a result, due to the increased rotation speed difference, the rotation speed $N_{P1}$ of the first planetary gear P1 becomes high, reaching the high rotation speed state.

If shifting is performed in this operating region, there is a fear that the rotation speed $N_{P1}$ of the first planetary gear P1 exceeds the allowable rotation speed range, to lower the durability of the first planetary gear P1. To prevent this, the shifting of the automatic shifting portion 20 by the manual shift operation is restricted (prohibited).

However, in a manual shift operation for shifting by the operation of a driver, the above-mentioned control to restrict the shifting of the automatic shifting portion 20 is frequently performed to protect a rotary element of the first electric motor M1 or that of the first planetary gear P1, there may occur following drawback. That is, operability of the manual shift operation may deteriorate for the driver.

In view of the above, according to the present invention, shifting is performed even in an operating region in which, ordinarily, the shifting of the automatic shifting portion 20 is restricted, thus improving the operability i.e. performance of the manual shift operation. A description will be hereinafter given of operation control that enables the shifting.

Referring back to FIG. 7, the shift operation determining means 100 determines whether a command for shifting by the manual shift operation is output. In more detail, it is determined whether the shift position $P_{SH}$ of the shift lever 52 of the shift operation device 48 is located at position "M" where a manual shift operation can be performed, and whether the manual shift operation commanded for shifting from, for example, range "4" to range "3" or from range "3" to range "2" is performed.

The shift permission region determining means 102 determines whether the rotation speed $N_{M1}$ of the first electric motor M1 during shifting falls within an allowable rotation speed range, when the shift is switched to a shift range commanded by the shift operation determining means 100. Furthermore, the shift permission region determining means 102 determines whether the expected rotation speed $N_{P1}$ of the first planetary gear P1 of the first planetary gear set 24 during shifting falls within an allowable rotation speed range, when the shift is switched to a shift range commanded by the shift operation determining means 100.

The expected rotation speed $N_{M1}$ of the first electric motor M1 during shifting is calculated based on the expected rotation speed $N_{M2}$ of the second electric motor M2 during shifting, the rotation speed $N_E$ of the engine 8, and the gear ratio $\rho1$ of the first planetary gear set 24. The expected rotation speed $N_{M2}$ of the second electric motor M2 during shifting is calculated by the product of the rotation speed $N_{OUT}$ of the output shaft 22 of the automatic shifting portion 20, which is uniquely determined from the vehicle speed V, and the speed ratio of a gear position to be changed. The rotation speed $N_E$ of the engine 8 is calculated on the assumption that it does not change before and after the shifting.

The expected rotation speed $N_{M1}$ of the first electric motor M1 during shifting is calculated with the relationship of the rotation speed of the planetary gear shown in Equation (1) mentioned below. Here, reference character $N_{S1}$ designates the rotation speed of the first sun gear S1 of the first planetary gear set 24, i.e., the rotation speed $N_{M1}$ of the first electric motor M1, reference character $N_{CA1}$ designates the rotation speed of the first carrier CA1, i.e., the rotation speed $N_E$ of the engine 8, reference character $N_{R1}$ designates the rotation speed of the first ring gear R1, i.e., the rotation speed $N_{18}$ of the power transmitting member 18.

$$(N_{R1}-N_{CA1})=-\rho1\times(N_{S1}-N_{CA1}) \qquad (1)$$

The shift permission region determining means 102 determines whether the rotation speed $N_{M1}$ of the first electric motor M1 calculated according to Equation (1) falls within a predetermined allowable rotation speed range.

In particular, when the shifting portion is shifted down by the manual shift operation during vehicle running at a comparatively high speed, the rotation speed $N_{M1}$ of the first electric motor M1 increases in the negative direction (reverse direction) in proportion to an increase in the rotation speed $N_{18}$ ($N_{R1}$) of the power transmitting member 18 (first ring gear R1). Therefore, the rotation speed $N_{M1}$ of the first electric motor M1 may exceed the allowable rotation speed range, that is, falls below the lower limit (e.g., about −13000 rpm) of a predetermined rotation speed of the first electric motor M1. If this case arises, the shift permission region determining means 102 makes a negative determination. According to a result of the endurance test of the first electric motor M1 or the like, the predetermined rotation speed is preset at a rotation speed to maintain sufficient durability.

The expected rotation speed $N_{P1}$ of the first planetary gear P1 of the first planetary gear set 24 during shifting is calculated as follow. It is calculated based on a rotation speed difference between the expected rotation speed $N_{R1}$ of the first ring gear R1 during shifting (i.e., rotation speeds $N_{18}$ and $N_{M2}$ of the power transmitting member 18 and the second electric motor M2, respectively), and the rotation speed $N_{CA1}$ of the first carrier CA1 (i.e., rotation speed $N_E$ of the engine 8). Likewise the rotation speed $N_{M2}$ of the second electric motor M2, the expected rotation speed $N_{R1}$ of the first ring gear R1 during shifting is calculated by the product of the rotation speed $N_{OUT}$ of the output shaft 22 of the automatic shifting portion 20 uniquely determined from the vehicle speed V, and the speed ratio of a gear position to be changed.

The rotation speed $N_{CA1}$ of the first carrier CA1 is regarded to be the same as the rotation speed $N_E$ of the engine 8, and is not changed during shifting. It is set at an engine rotation speed $N_E$ determined before shifting. Based on these: the rotation speed $N_{P1}$ of the first planetary gear P1 is calculated using a well-known relational expression of the planetary gear. The shift permission region determining means 102 determines whether the rotation speed $N_{P1}$ of the first planetary gear P1 calculated above falls within an allowable rotation speed range preset.

In particular, when the shifting portion is shifted down by the manual shift operation during at the comparatively high speed running, the rotation speed $N_{18}$ of the power transmitting member 18, i.e., the rotation speed $N_{R1}$ of the first ring gear R1 increases. As a result, the rotation speed difference (relative rotation speed) may be increased, which makes the rotation speed $N_{P1}$ of the first planetary gear P1 high. If this case arises, the shift permission region determining means 102 makes a negative determination.

A negative determination by the shift permission region determining means 102 means that the rotation speeds of the first electric motor M1 and the first planetary gear P1 exceed the allowable rotation speed range, as a result of shifting performed by the manual shift operation. In this case, a correspondence region determining means 104 determines whether a correspondence controlling means 106 (described later) can be allowed to act.

In an operating region in which the shift permission region determining means 102 made a negative determination to restrict (to prohibit) the shifting of the automatic shifting portion 20 by the manual shift operation, the correspondence controlling means 106 controls the transmission mechanism 10 (differential portion 11) to allow the automatic shifting portion 20 to be shifted In more detail, changing the rotation speed $N_{M1}$ of the first electric motor M1 allows shifting of the automatic shifting portion 20 in an operating region which restricts the shifting 20.

For example, there is a case when the rotation speed of the power transmitting member 18, i.e., the rotation speed $N_{M1}$ of the first electric motor M1 falls below a predetermined rotation speed by the high-speed rotation in the negative direction (reverse direction) during downshifting. In this case, the correspondence controlling means 106 operates to rotate the first electric motor M1 to thereby prevent the high rotation thereof in the negative direction. As a result, downshifting can be performed in the operating region which restricts shifting in ordinary cases. In other words, with no such control performed, the rotation speed $N_{M1}$ of the first electric motor M1 is made high in the negative direction, as shown by the broken line "b" of FIG. 10.

Figure 11:
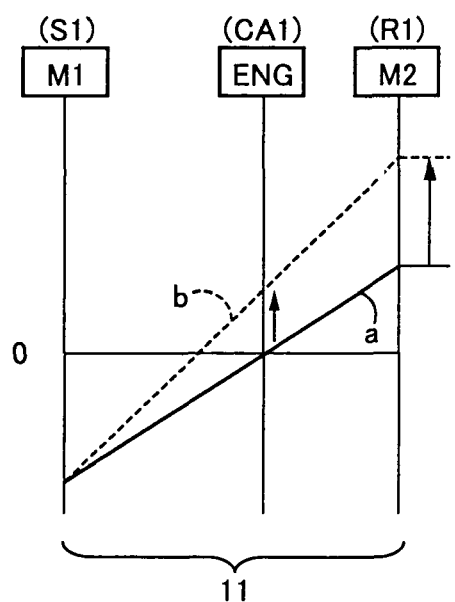
FIG. 11 is another collinear chart showing the relative rotation speed of each rotary element of the first planetary gear set serving as a part of the differential portion.

In this example, the correspondence controlling means 106 performs feedback control so as not to change the rotation speed $N_{M1}$ of the first electric motor M1 during downshifting as shown by the broken line "b" of FIG. 11. Thus, the rotation speed $N_{M1}$ of the first electric motor M1 is prevented from being rotated high in the negative rotational direction during downshifting.

The correspondence controlling means 106 controls in this way the rotation speed $N_{M1}$ of the first electric motor M1 to fall within the allowable rotation speed range during shifting by a manual shift operation. In particular, when the command for downshifting is issued by the manual shift operation, the rotation speed $N_{M1}$ of the first electric motor M1 is controlled to exceed the predetermined rotation speed.

When the rotation speed $N_{R1}$ of the first ring gear R1 increases by the downshifting, the rotation speed $N_{M1}$ of the first electric motor M1, i.e., the rotation speed $N_{S1}$ of the first sun gear S1 serving as one rotary element of the differential portion 11 is controlled by the correspondence controlling means 106 to be maintained at a constant rotation speed. The rotation speed $N_{CA1}$ of the first carrier CA1, which is the rotation speed $N_E$ of the engine 8, increases as shown by the broken line "b" of FIG. 11. As a result, the relative rotation speed between the first ring gear R1 (or the second electric motor M2) and the first carrier CA1 (or the engine 8) becomes small.

The rotation speed $N_{P1}$ of the first planetary gear P1, which is a rotary element between the rotary elements of the first ring gear R1 and the first carrier CA1, becomes small, and it is kept within an allowable rotation speed range, for example, below the predetermined rotation speed of about 10000 rpm. Thus, the rotation speed $N_{P1}$ of the first planetary gear P1 is also prevented from becoming high, which allows shifting in the operating region which restricts (prohibits) shifting conventionally. The predetermined rotation speed of the first planetary gear P1 is preset by an endurance test or the like at a rotation speed which can maintain sufficient durability.

The correspondence controlling means 106 controls the rotation speed $N_{P1}$ of the first planetary gear P1 of the differential portion 11 (the first planetary gear set 24) to fall within the allowable rotation speed range during shifting by the manual shift operation in this way. In other words, the correspondence controlling means 106 controls the relative rotation speed between the rotary elements of the differential portion 11 to fall within the allowable rotation speed range. Particularly, during downshifting by the manual shift operation, the correspondence controlling means 106 controls the relative rotation speed between the rotary elements of the differential portion 11 (the first planetary gear set 24) to fall below the predetermined rotation speed.

A concrete determining method performed by the correspondence region determining means 104 determining whether the correspondence controlling means 106 can be operated is explained. For example, the charge capacity of the battery device 56 to drive the first electric motor M1 is detected. If this charge capacity is below a predetermined capacity, due to difficulty to control the first electric motor M1, the correspondence region determining means 104 makes a negative determination. Furthermore, with the correspondence controlling means 106 being executed in a state in which the first ring gear R1 is rotating at a high rotation speed, if the rotation speed $N_E$ of the engine 8 is expected to reach an overrun state, the correspondence region determining means 104 makes a negative determination.

When this case arises, the correspondence controlling means 106 can not execute operation thereof, to restrict (reject) the shifting of the automatic shifting portion 20 by the manual shift operation.

Figure 12:
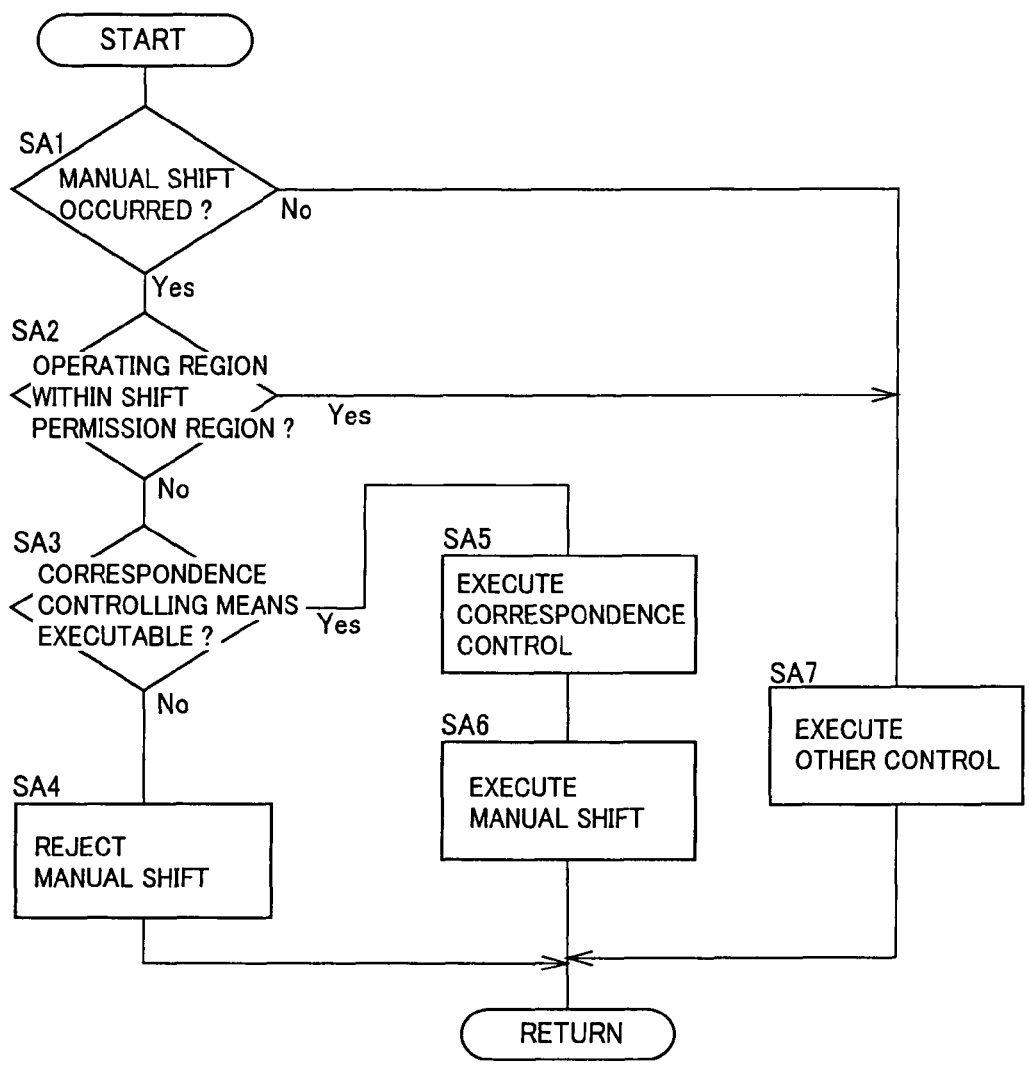
FIG. 12 is a flow chart explaining a main part of the control operation of an electronic control device, i.e., explaining a control operation to perform shifting even in an operating region in which restrictions are imposed on shifting performed by a manual shift operation.

FIG. 12 is a flow chart explaining a main part of a control operation of the electronic control device 80, i.e., a flow chart explaining a control operation that enables shifting even in the operating region which restricts shifting by the manual shift operation. This sequence is repeatedly carried out in an extremely short cycle time of from, for example, several microseconds to several tens of microseconds.

In FIG. 12, first, in step SA1 corresponding to the shift operation determining means 100, it is determined whether switching between shift ranges, for example, from range "4" to range "3" by a manual shift operation occurred. If a negative determination is made in step SA1, another control operation, such as ordinary automatic shift control, according to the shifting diagram is performed in step SA7, after which this routine is ended.

If an affirmative determination is made in step SA1, when switching is performed to the shift range indicated by the manual shift operation in step SA2 corresponding to the shift permission region determining means 102, whether the operating region of the vehicle is within the shift permission region is determined. In more detail, in this embodiment, whether the rotation speed $N_{M1}$ of the first electric motor M1 or the rotation speed $N_{P1}$ of the first planetary gear P1 mentioned above falls within the predetermined rotation speed range is determined. If an affirmative determination is made in step SA2, another control operation is performed in step SA7, after which this routine is ended.

If a negative determination is made in step SA2, it is determined whether the correspondence controlling means 106 can be executed in step SA3 corresponding to the correspondence region determining means 104. If a negative determination is made in step SA3, i.e., if it is determined that the correspondence controlling means 106 cannot be executed, shifting by the manual shift operation is rejected in step SA4. At this time, by use of, for example, a buzzer or a warning lamp, a driver may be informed of restriction of the manual shift operation.

If an affirmative determination is made in step SA3, the first electric motor M1 is controlled in step SA5 corresponding to the correspondence controlling means 106 to prevent the first electric motor M1 from being rotated in the negative direction at the high speed, or to prevent the first planetary gear P1 from being rotated at the high speed. According to the correspondence control of step SA5, shifting to the restricted shift range is performed in step SA6. In the flow chart, while the correspondence control of step SA5 and the shift control of step SA6 are described as being performed in sequence, they are concurrently performed actually.

Figure 13:
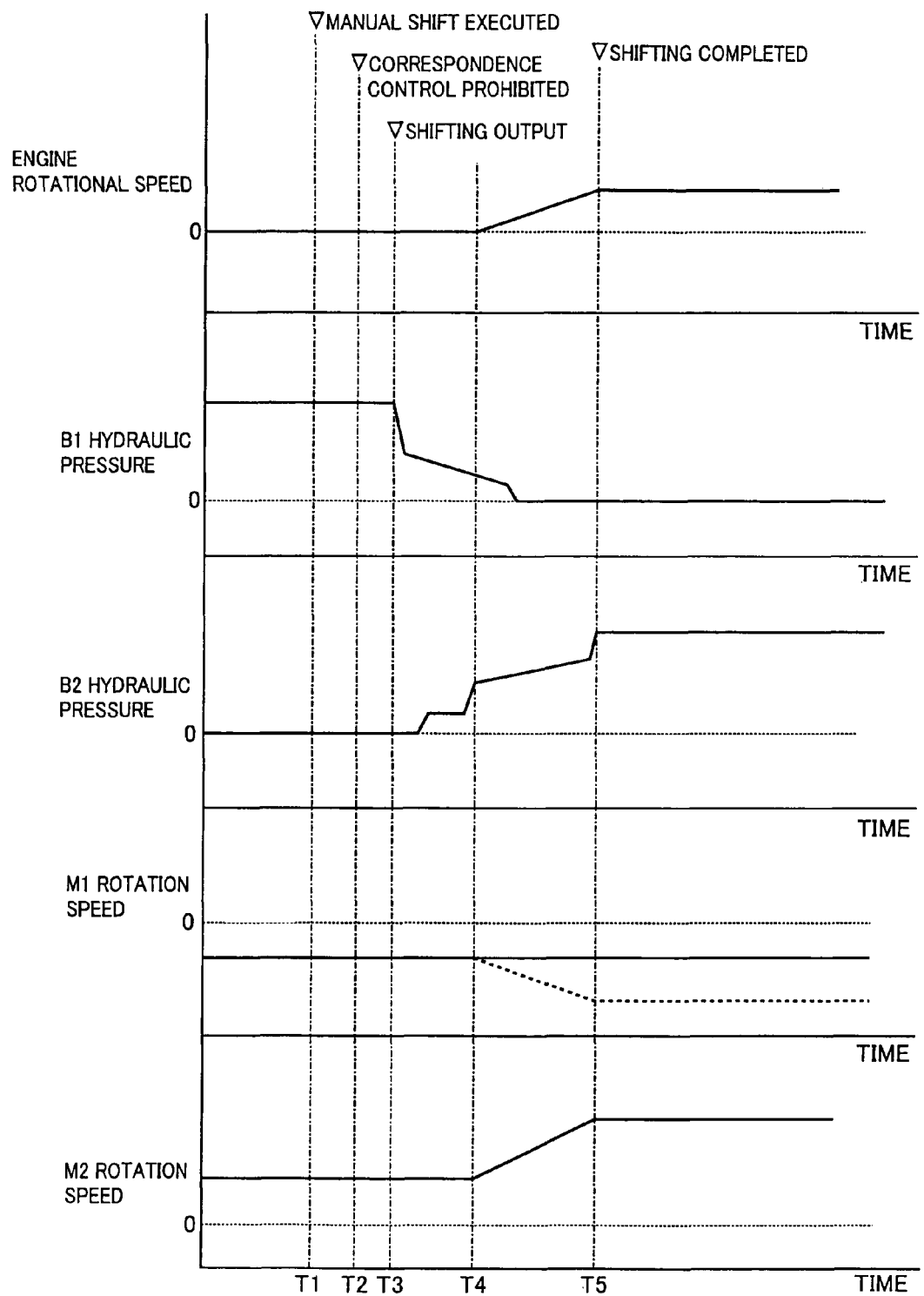
FIG. 13 is a time chart explaining the control operation shown in the flow chart of FIG. 12, showing an example in which downshifting from range "3" to range "2" is performed by a manual shift operation during motor running by use of a second electric motor.

FIG. 13 is a time chart explaining the control operation shown in the flow chart of FIG. 12, showing an example in which the shifting portion is shifted down from range "3" to range "2" by the manual shift operation during motor running by, for example, the second electric motor M2. Although this time chart illustrates a state of motor running by the second electric motor M2 as one example, a similar effect can be obtained when the present invention is applied, for example, to the vehicle coasting (i.e., upon regenerating) during engine running.

If a command for downshifting by the manual shift operation is output at time point T1, operation of the shift permission region determining means 102 is executed. Thereafter, if the shift permission region determining means 102 makes a negative determination, operation of the correspondence region determining means 104 is executed. If it is determined that the correspondence controlling means 106 cannot be executed at time point T2, the downshifting is restricted (prohibited). Shifting started at time point T3, and clutch-to-clutch shifting is performed, in which the first brake B1 is released and the second brake is engaged.

The rotation speed $N_{M1}$ of the first electric motor M1 enters into an inertia phase range at time point T4, and the rotation speed $N_{M2}$ of the second electric motor M2 increases. Accordingly, the rotation speed $N_{M1}$ of the first electric motor M1 is controlled to maintain at a constant rotation speed not to increase in the negative direction by the correspondence controlling means 106. As a result, the rotation speed $N_{M1}$ of the first electric motor M1 is constantly maintained in the inertia phase. Additionally, the rotation speed $N_E$ of the engine 8 is increased by controlling the rotation speed $N_{M1}$ of the first electric motor M1. When operation of the correspondence controlling means 106 is not executed, the rotation speed $N_{M1}$ of the first electric motor M1 increases in the negative rotational direction as shown by the broken line.

Effects obtained in the first embodiment will be hereinafter described. According to this embodiment, the correspondence controlling means 106 which controls the transmission mechanism 10 (differential portion 11) allows the shifting of the automatic shifting portion 20 when the command for shifting by the manual shift operation is output in the operating region restricting the shifting of the automatic shifting portion 20. Therefore, an executable range allowing shifting by the manual shift operation can be enlarged, and the performance (i.e., operability) of the manual shift operation can be improved.

According to this embodiment, the correspondence controlling means 106 controls the first electric motor M1 so that the rotation speed $N_{M1}$ thereof falls within the allowable rotation speed range during shifting. Therefore, during the manual shift operation, shifting can be performed even in the operating region which restricts shifting in ordinary cases because of the exceeded rotation speed $N_{M1}$ of the first electric motor M1 over the allowable rotation speed range during shifting.

According to this embodiment, the correspondence controlling means 106 controls the first planetary gear P1 of the first planetary gear set 24 constructing the differential portion 11 so that the rotation speed $N_{P1}$ thereof falls within the allowable rotation speed range during shifting. Therefore, when the manual shift operation is performed, shifting can be performed even in the operating region which restricts shifting in ordinary cases because of the exceeded rotation speed $N_{P1}$ thereof over the allowable rotation speed range during shifting.

According to this embodiment, the correspondence controlling means 106 changes the rotation speed $N_{M1}$ of the first electric motor M1, for thereby allowing shifting in the operating region which restricts the shifting of the automatic shifting portion 20. Therefore, by enlarging the executable region in which shifting can be performed by the manual shift, the operability of the manual shift operation can be improved.

According to this embodiment, the correspondence controlling means 106 controls the rotation speed of the first sun gear S1 constructing the differential portion 11 by controlling the rotation speed $N_{M1}$ of the first electric motor M1. Thus, the first sun gear S1 constructing the differential portion 11 can be prevented from being rotated in the negative direction at the high speed during shifting. Therefore, shifting can be performed in the operating region which restricts the shifting of the automatic shifting portion 20.

According to this embodiment, the command for shifting by the manual shift operation is for the downshifting. The correspondence controlling means 106 control the first electric motor M1 so that the rotation speed $N_{M1}$ thereof exceeds the predetermined rotation speed during shifting. Therefore, the rotation speed $N_{M1}$ of the first electric motor M1 is prevented from being rotated in the negative rotational direction (reverse direction) at the high speed during shifting.

According to this embodiment, the command for shifting by the manual shift operation is for the downshifting. The correspondence controlling means 106 controls the first planetary gear P1 of the first planetary gear set 24 constructing of the differential portion 11 so that the rotation speed $N_{P1}$ thereof becomes below the predetermined rotation speed during shifting. Therefore, the rotation speed $N_{P1}$ of the first planetary gear P1 of the differential portion 11 is prevented from reaching the high speed state during shifting.

Since the automatic shifting portion 20 is a step-variable transmission, the operating region is generated to restrict the shifting of the automatic shifting portion 20 based on the speed ratio of the gear position to be changed during shifting. According to this embodiment, such a shifting of the shifting portion 20 can be performed by the correspondence controlling means 106 to the gear position desired by a driver.

According to this embodiment, thanks to the automatic shifting, the automatic shifting portion 20 can be automatically shifted according to the vehicle running state, in addition to the manual shift operation, to render a suitable driving torque.

According to this embodiment, the differential portion 11 serves as the continuously variable shifting mechanism by controlling the operational state of the first electric motor M1. Therefore, the continuously variable transmission is constructed by the differential portion 11 and the automatic shifting portion 20, in which the driving torque can be smoothly changed. The differential portion 11 can serve also as the step-variable transmission by changing the speed ratio step by step, in addition to the electrically controlled continuously variable transmission by continuously changing the speed ratio.

According to this embodiment, the differential portion 11 is constructed by the first electric motor M1, the second electric motor M2, and the first planetary gear set 24. Therefore, the differential portion 11 can serve as the continuously variable transmission by controlling the rotation speed of each rotary element of the first planetary gear set 24 with control of the first electric motor M1 and the second electric motor M2.

According to this embodiment, the automatic shifting portion 20 comprised of the automatic transmission is shifted according to the vehicle running state, to render the suitable driving torque.

Second Embodiment

Next, a second embodiment of the present invention will be described. In the following description, the same reference numerals are given to the same parts as in the first embodiment, and descriptions thereof are omitted.

The correspondence controlling means 106 of the second embodiment controls the engine 8 to allow shifting of the automatic shifting portion 20, when the shift permission region determining means 102 makes the negative determination, that is in the operating region in which the shifting of the automatic shifting portion 20 by a manual shift operation is restricted (prohibited).

In the collinear chart of FIG. 14, when the differential portion 11 is shifted down by the manual shift operation in the rotation state shown by the solid line "a," the rotation speed $N_{M1}$ of the first electric motor M1 is made in the negative direction at the high speed as shown by the alternate long and short dash line "b." If the rotation speed $N_{M1}$ falls below the predetermined rotation speed, the durability of the first electric motor M1 deteriorates to restrict shifting. In view of this, the correspondence controlling means 106 changes the rotation speed $N_E$ of the engine 8 to allow shifting of the automatic shifting portion 20 in the operating region which restricts the shifting.

Figure 14:
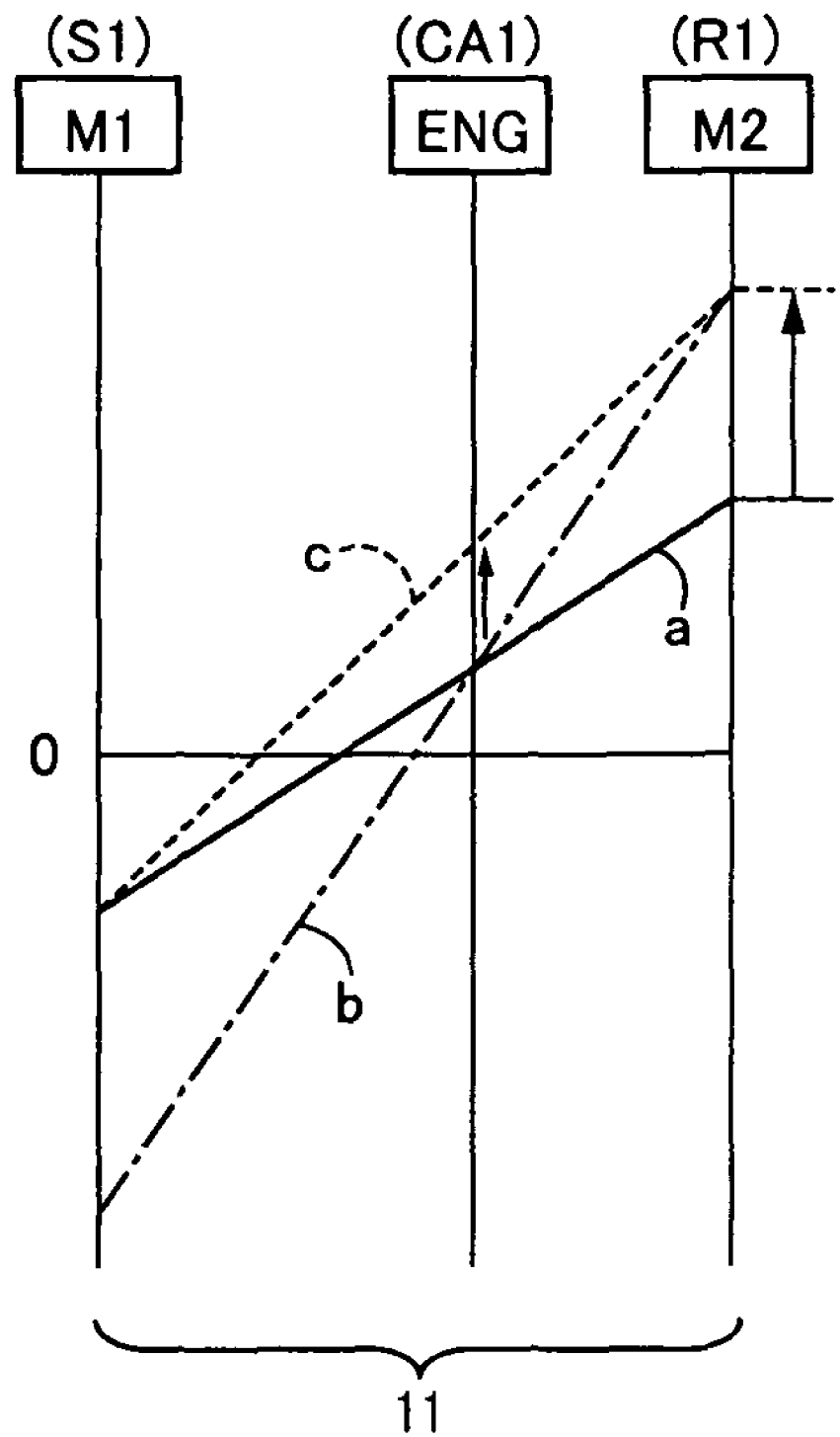
FIG. 14 is still another collinear chart showing the relative rotation speed of each rotary element of the first planetary gear set serving as a part of the differential portion.

In more detail, in the downshifting by the manual shift operation, the correspondence controlling means 106 controls the engine 8 to increase the rotation speed $N_E$ thereof so that the rotation speed $N_{CA1}$ of the first carrier CA1 connected to the engine 8 increases as shown by the broken line "c" of FIG. 14. Thereafter, by increasing the rotation speed $N_{CA1}$ of the first carrier CA1 that is the rotary element of the differential portion 11, the differential operation of the differential portion 11 prevents the rotation speed $N_{M1}$ of the first electric motor M1 from rotated in the negative rotational direction at the high speed as shown by the broken line "c."

The rotation speed $N_{CA1}$ of the first carrier CA1 also increases with an increase in the rotation speed $N_E$ of the engine 8, so that the relative rotation speed between the first ring gear R1 and the first carrier CA1 becomes small. Thus, the increased rotation speed $N_{P1}$ of the first planetary gear P1 is avoided, which allows shifting of the automatic shifting portion 20.

The rotation speed $N_E$ of the engine 8 is controlled by the correspondence controlling means 106 so that the rotation speed $N_{M1}$ of the first electric motor M1 does not fall below the predetermined rotation speed with respect to the expected rotation speed $N_{R1}$ of the first ring gear R1 during shifting. Preferably, this control is performed during the engine running in order to allow the engine 8 to increase its rotation speed $N_E$. Alternatively, this control can be performed after the rotation speed of the engine 8 temporarily increases by the first electric motor M1 to a startable level, by starting the engine 8.

The correspondence region determining means 104 of this embodiment determines, for example, whether the engine 8 is in the operable state, or whether the rotation speed $N_E$ of the engine 8 falls within the operating region below the predetermined rotation speed to avoid overrun state of the engine 8 during shifting. If the correspondence region determining means 104 makes a negative determination, the command for shifting by the manual shift operation is prohibited (rejected). The flow chart of this embodiment is substantially the same as the flow chart of FIG. 12, in which the engine 8 is controlled in step SA5 to executed operation of the correspondence controlling means 106.

As described above, according to the second embodiment, the correspondence controlling means 106 changes the rotation speed $N_E$ of the engine 8, to allow shifting of the automatic shifting portion 20 in the operating region which restricts the shifting. Therefore, the operable range which can perform by shifting the manual shift operation can be enlarged, and the operability of the manual shift operation can be improved.

According to this embodiment, the correspondence controlling means 106 controls the rotation speed $N_E$ of the engine 8, to thereby control the first carrier CA1 of the first planetary gear set 24 constructing the differential portion 11. As a result, each rotary element of the differential portion 11 can be prevented from being rotated at the high speed rotation during shifting, so that shifting can be executed in the operating region which restricts the shifting of the automatic shifting portion 20.

<Modifications>

Although the above first and second embodiments of the present invention were described in detail with reference to the attached drawings, the present invention can be embodied in other modes i.e. forms.

For example, in the above embodiments, the rotation speed $N_{M1}$ of the first electric motor M1 is controlled so that its rotation speed does not change during shifting. However, this control is one example. The rotation speed $N_{M1}$ of the first electric motor M1 can be freely controlled in the range not to fall below the predetermined rotation speed.

In the above embodiments, the rotation speed $N_{M1}$ of the first electric motor M1 is constantly maintained during shifting by increasing the rotation speed $N_E$ of the engine 8. However, this control is one example. The rotation speed $N_{M1}$ of the first electric motor M1 can be freely controlled in the range not to fall below a predetermined rotation speed.

In the above embodiments, the predetermined rotation speed of the first electric motor M1 is set at −13000 rpm, and the predetermined rotation speed of the first planetary gear P1 is set at 10000 rpm. However, each of these values is one example. These values can be appropriately changed according to the specifications of the first electric motor M1, and the structure of the first planetary gear set 24 constructing the first planetary gear P1.

In the above embodiments, the correspondence controlling means 106 controls the engine 8 or the first electric motor M1, for thereby allowing the automatic shifting portion 20 to perform shifting. However, these may be carried out by an appropriate combination depending on the vehicle state.

In the above embodiments, when the correspondence region determining means 104 makes the negative determination, shifting is prohibited, which is informed by the buzzer or the warning lamp. However, this function is not necessarily needed.

In the above embodiments, description was given of the correspondence controlling means 106 for downshifting by the manual shift operation. However, the manual shifting is not necessarily restricted to downshifting, and can includes the upshifting. For example, when upshifting is performed in the comparatively high speed of the engine 8, the rotation speed $N_{M2}$ of the second electric motor M2 decreases, and the rotation speed $N_{M1}$ of the first electric motor M1 increases. Even in this case, the correspondence controlling means 106 controls the first electric motor M1 to avoid the high speed rotation, thus allowing the automatic shifting portion 20 to perform shifting.

In the above embodiments, the second electric motor M2 is connected to the power transmitting member 18. However, the connecting portion of second electric motor M2 is not limited to this mode. The second electric motor M2 can be connected to the power transmitting path extending from the differential portion 11 to the drive wheel 34 directly or indirectly via the transmission and the like.

In the above embodiments, while the differential portion 11 is configured to function as the electrically controlled continuously variable transmission in which the speed ratio $\gamma 0$ is continuously varied from the minimal value $\gamma 0_{min}$ to the maximal value $\gamma 0_{max}$. However, the present invention may be applied even to a case wherein the speed ratio $\gamma 0$ of the differential portion 11 is not continuously varied but pretended to vary step-by-step using the differential action.

In the above embodiments, moreover, the differential portion 11 may be of the type that includes a differential action limiting device incorporated in the power distributing mechanism 16 for limiting a differential action to be operative as at least a forward two-stage step-variable transmission.

With the power distribution mechanisms 16 of the above embodiments, the first carrier CA1 is connected to the engine 8; the first sun gear S1 is connected to the first electric motor M1; and the first ring gear R1 is connected to the power transmitting member 18. However, the present invention is not necessarily limited to such connecting arrangement. The engine 8, first electric motor M1 and power transmitting member 18 have no objection to be connected to either one of the three elements CA1, S1 and R1 of the first planetary gear set 24.

While the above embodiments were described with reference to the engine 8 directly connected to the input shaft 14, these component parts may suffice to be operatively connected via, for instance, gears, belts or the like. No need may arise for the engine 8 and the input shaft 14 to be necessarily disposed on a common axis.

Further, while the above embodiments were described with reference to the first electric motor M1 and the second electric motor M2 wherein the first electric motor M1 is coaxially disposed with the drive apparatus input shaft 14 and connected to the first sun gear S1 upon which the second electric motor M2 is connected to the power transmitting member 18. However, no need arises for these component parts to be necessarily placed in such connecting arrangement. For example, the first electric motor M1 may be connected to the first sun gear S1 through gears, a belt or the like, and the second electric motor M2 may be connected to the power transmitting member 18.

In the above embodiments, further, the hydraulically operated frictional coupling devices such as the first and second clutches C1, C2 may include magnetic type clutches such as powder (magnetic powder) clutches, electromagnetic clutches and meshing type dog clutches, and electromagnetic type and mechanical coupling devices. For instance, with the electromagnetic clutches being employed, the hydraulic control circuit 70 may not include a valve device for switching hydraulic passages and may be replaced with a switching device or electromagnetically operated switching device or the like that are operative to switch electrical command signal circuits for electromagnetic clutches.

While the above embodiments were described with reference to the automatic shifting portion 20 that is connected to the differential portion 11 in series via the power transmitting member 18, a countershaft may be provided in parallel to the input shaft 14 to allow the automatic shifting portion 20 to be coaxially disposed on an axis of the countershaft. In this case, the differential portion 11 and the automatic shifting portion 20 may be connected to each other in power transmitting capability via a set of transmitting members structured of, for instance, a counter-gear pair acting as the power transmitting member 18, a sprocket and a chain.

Further, the power distributing mechanism 16 of the illustrated embodiment may include, for instance, a differential gear set in which a pinion, rotatably driven with the engine, and a pair of bevel gears, held in meshing engagement with the pinion, are operatively connected to the first electric motor M1 and the power transmitting member 18 (second electric motor M2).

The power distributing mechanism 16 of the above embodiments was described as including one set of planetary gear units, the power distributing mechanism 16 may include two or more sets of planetary gear units that are arranged to function as a transmission having three or more speed positions under a non-differential state (fixed shifting state). In addition, the planetary gear unit is not limited to the single-pinion type, but may be of a double-pinion type.

The present invention can be applied to the power differential mechanism 16 including two or more planetary gear units having following structure. That is, in the power differential mechanism 16, to each of the rotary elements of these planetary gear units the engine 8, the first and second electric motors M1 and M2 are connected in the power transmissive state. In addition, the step variable shifting state and the continuously variable shifting state are selectively switched by controlling the clutch and the brake connected to the rotary elements of the planetary gear unit.

In the above embodiments, the engine 8 and the differential portion 11 are directly connected with each other. However, such direct connection is not essential, and the engine 8 and the differential portion 11 can be indirectly connected via a clutch interposed therebetween.

In the above embodiments, the differential portion 11 and the automatic shifting portion 20 are connected to each other in series in the structure. However, the present invention can be applied to a structure even if the differential portion 11 and the automatic shifting portion 20 are mechanically independent from each other, provided that a whole of the shifting mechanism 10 has a function to achieve an electrically controlled differential action enabling a differential state to be electrically varied, and a function to perform a shifting on a principle different from the function of the electrically controlled differential action. Arranging position and arranging order of the differential portion 11 and the automatic shifting portion 20 are not limited in the above mode but can be freely changed.

The present invention can be applied to any of the shifting mechanism as long as it includes the function to perform the electrically controlled differential action and the function to perform the shifting, although they are partially overlapped or they are totally identical in structure.

While the shift operating device 50 of the above embodiments is described with reference to the shift lever 52 operative to select a plurality of kinds of shift positions $P_{SH}$, the shift lever 52 may be replaced by other type of switches or devices. These may include, for instance a select switch such as a press-button type switch and a slide-type switch available to select one of a plurality of shift positions $P_{SH}$; a device operative to switch a plurality of shift positions $P_{SH}$ in response not to the manipulation initiated by the hand but to a driver's voice; and a device operative to switch a plurality of shift positions $P_{SH}$ in response to the manipulation initiated by the foot.

While the above embodiments were described with reference to the shifting range that is established upon manipulating the shift lever 52 to the "M" position, the gear positions may be set, i.e., maximal speed gear positions for respective shifting ranges may be set as the gear positions. In this case, the automatic shifting portion 20 operates so as to allow the gear positions to be switched for executing the shifting action. For example, as the shift lever 52 is manually operated to an up-shift position "+" or a down-shift position "−" in the "M" position, the automatic shifting portion 20 operates so as to allow any of the 1st-speed gear position to the 4th-speed gear position to be set depending on the manipulation of the shift lever 52.

The foregoing merely illustrates the embodiments for illustrating the principles of the present invention. It will be appreciated by those skilled in the art that various modifications and alternatives to those details could be developed in the light of the overall teachings of the disclosure.

What is claimed is:

1. A control device for a vehicle power transmitting apparatus, wherein the vehicle power transmitting apparatus comprises (i) an electrically controlled differential portion of which differential state is controlled between a rotation speed of an input shaft to which power of an engine is input and a rotation speed of an output shaft by controlling an operational state of an electric motor connected to a rotary element of a differential mechanism, and (ii) a shifting portion constructing a part of a power transmitting path, and the control device includes correspondence controlling means for controlling the engine or the vehicle power transmitting apparatus to allow the shifting portion to be shifted when a command for shifting by a manual shift operation is issued in an operating region restricting the shifting of the shifting portion.

2. The control device for the vehicle power transmitting apparatus of claim 1, wherein the correspondence controlling means controls the engine or the vehicle power transmitting apparatus so that a rotation speed of the electric motor falls within an allowable rotation speed range during shifting.

3. The control device for the vehicle power transmitting apparatus of claim 1, wherein the correspondence controlling means controls the engine or the vehicle power transmitting apparatus so that a relative rotation speed between rotary elements of the electrically controlled differential portion falls within an allowable rotation speed range during shifting.

4. The control device for the vehicle power transmitting apparatus of claim 1, wherein the correspondence controlling means changes the rotation speed of the engine to allow shifting of the shifting portion in the operating region restricting the shifting.

5. The control device for the vehicle power transmitting apparatus of claim 4, wherein the correspondence controlling means controls the rotation speed of the engine to controls a rotation speed of one rotary element constructing the electrically controlled differential portion.

6. The control device for the vehicle power transmitting apparatus of claim 1, wherein the correspondence controlling means changes the rotation speed of the electric motor to allow shifting of the shifting portion in the operating region restricting the shifting.

7. The control device for the vehicle power transmitting apparatus of claim 6, wherein the correspondence controlling means controls the rotation speed of the electric motor to control a rotation speed of one rotary element constructing the electrically controlled differential portion.

8. The control device for the vehicle power transmitting apparatus of claim 1, wherein the command for shifting by a manual shift operation is a command for downshifting, and the correspondence controlling means controls the engine or the vehicle power transmitting apparatus so that the rotation speed of the electric motor exceeds a predetermined rotation speed during shifting.

9. The control device for the vehicle power transmitting apparatus of claim 1, wherein the command for shifting by a manual shift operation is a command for downshifting, and the correspondence controlling means controls the engine or the vehicle power transmitting apparatus so that a relative rotation speed between rotary elements of the electrically controlled differential portion falls below a predetermined rotation speed during shifting.

10. The control device for the vehicle power transmitting apparatus of claim 1, wherein the shifting portion is a step-variable transmission.

11. The control device for the vehicle power transmitting apparatus of claim 1, wherein the shifting portion can be automatically shifted.

12. The control device for the vehicle power transmitting apparatus of claim 1, wherein the electrically controlled differential portion is controlled in an operational state of the electric motor to operate as a continuously variable shifting mechanism.

13. The control device for the vehicle power transmitting apparatus of claim 1, wherein the electrically controlled differential portion is constructed by two or more electric motors and a gear set.

14. The control device for the vehicle power transmitting apparatus of claim 1, wherein the shifting portion is an automatic transmission.

15. The control device for the vehicle power transmitting apparatus of claim 13, wherein the gear set is formed of a planetary gear set.

16. The control device for the vehicle power transmitting apparatus of claim 1, wherein a speed ratio of the shifting portion and a speed ratio of the electrically controlled differential portion establishes a total speed ratio of the vehicle power transmitting apparatus.

17. The control device for the vehicle power transmitting apparatus of claim 1, wherein the control device further includes shift operation determining means determining whether a command for shifting by the manual shift operation is output, and shift permission region determining means determining whether the rotation speed of the first electric motor during shifting falls within an allowable rotation speed range.

18. The control device for the vehicle power transmitting apparatus of claim 1, wherein the control device further includes correspondence region determining means determining whether a correspondence controlling means is allowed to act.

19. The control device for the vehicle power transmitting apparatus of claim 18, wherein when the correspondence controlling means is not allowed to act, the correspondence region determining means restricts shifting of the shifting portion.

\* \* \* \* \*